(12) United States Patent
Shin et al.

(10) Patent No.: US 12,003,804 B2
(45) Date of Patent: Jun. 4, 2024

(54) INFORMATION PROCESSING DEVICE, INFORMATION PROCESSING METHOD, AND COMPUTER PROGRAM

(71) Applicant: Sony Corporation, Tokyo (JP)

(72) Inventors: Andrew Shin, Tokyo (JP); Naoki Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 438 days.

(21) Appl. No.: 17/275,671

(22) PCT Filed: Aug. 16, 2019

(86) PCT No.: PCT/JP2019/032184
§ 371 (c)(1),
(2) Date: Mar. 12, 2021

(87) PCT Pub. No.: WO2020/079941
PCT Pub. Date: Apr. 23, 2020

(65) Prior Publication Data
US 2022/0046310 A1 Feb. 10, 2022

(30) Foreign Application Priority Data
Oct. 15, 2018 (JP) .................. 2018-193999

(51) Int. Cl.
*G06F 3/01* (2006.01)
*G10L 15/22* (2006.01)
*H04N 21/422* (2011.01)

(52) U.S. Cl.
CPC ....... *H04N 21/42203* (2013.01); *G06F 3/017* (2013.01); *G10L 15/22* (2013.01); *H04N 21/42222* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS

| | | | | |
|---|---|---|---|---|
| 2002/0013710 A1* | 1/2002 | Shimakawa | .......... | H04L 12/282 704/E15.044 |
| 2011/0184730 A1* | 7/2011 | LeBeau | .................. | G10L 15/30 704/235 |

(Continued)

FOREIGN PATENT DOCUMENTS

| EP | 2 555 538 A1 | 2/2013 |
|---|---|---|
| JP | 2002-62962 A | 2/2002 |

(Continued)

OTHER PUBLICATIONS

International Search Report and Written Opinion dated Nov. 5, 2019, received for PCT Application PCT/JP2019/032184 Filed on Aug. 16, 2019, 10 pages including English Translation.

(Continued)

*Primary Examiner* — Leonard Saint-Cyr
(74) *Attorney, Agent, or Firm* — XSENSUS LLP

(57) ABSTRACT

To provide an information processing device, an information processing method, and a computer program that assist a device operation of a user.
An information processing device includes an input unit that receives input from a user, and a presentation unit that presents information regarding a command for operating a predetermined device on the basis of the input. The input unit receives input by at least one of voice or gesture from a user. The presentation unit presents a candidate of a command including at least one of voice or gesture and partially matching the input.

13 Claims, 20 Drawing Sheets

(56) References Cited

U.S. PATENT DOCUMENTS

| | | | | |
|---|---|---|---|---|
| 2014/0136205 A1* | 5/2014 | Jang | ................... | H04N 21/4131 |
| | | | | 704/249 |
| 2014/0181865 A1* | 6/2014 | Koganei | ............ | H04N 21/4312 |
| | | | | 725/38 |
| 2017/0133009 A1* | 5/2017 | Cho | ........................ | G10L 15/22 |
| 2017/0205888 A1 | 7/2017 | Nicholson et al. | | |
| 2017/0230316 A1 | 8/2017 | Sharma et al. | | |

FOREIGN PATENT DOCUMENTS

| | | |
|---|---|---|
| JP | 2008-84404 A | 4/2008 |
| JP | 2016-42394 A | 3/2016 |
| JP | 2016-134063 A | 7/2016 |
| JP | 2018-120203 A | 8/2018 |

OTHER PUBLICATIONS

Snell et al., "Prototypical Networks for Few-Shot Learning", Nips, Jun. 19, 2017, pp. 1-13.

* cited by examiner

FIG. 3
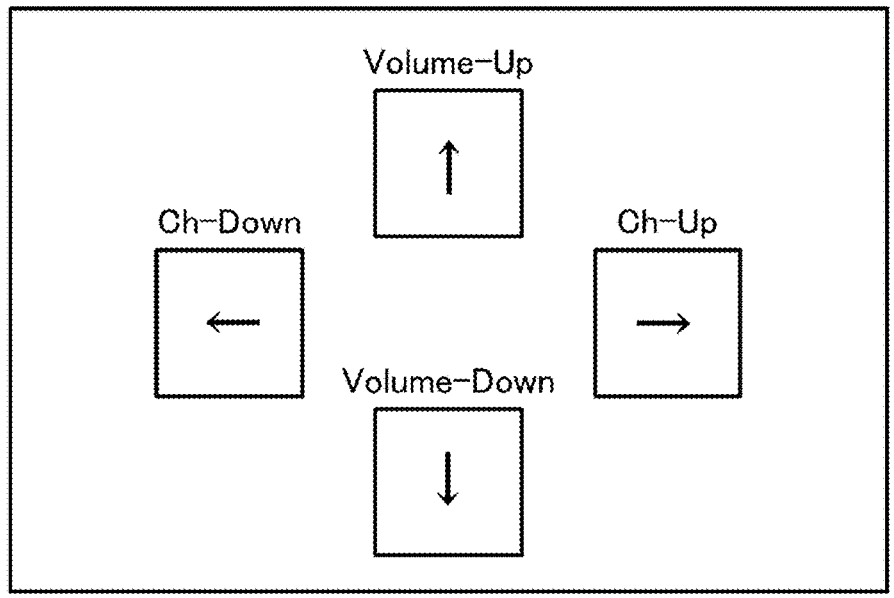
FIG. 4
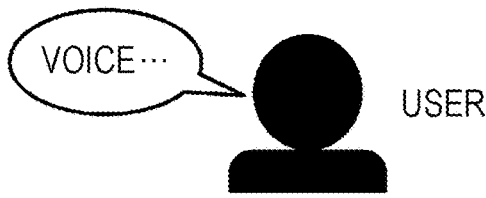
SAY "VOLUME UP" TO TURN UP THE VOLUME
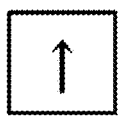 OR, TURN YOUR FACE UPWARD.
OR, POINT UPWARD WITH YOUR INDEX FINGER.
OR, PUT YOUR HAND UPWARD.
SAY "VOLUME DOWN" TO TURN DOWN THE VOLUME
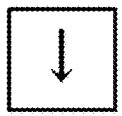 OR, TURN YOUR FACE DOWNWARD.
OR, POINT DOWNWARD WITH YOUR INDEX FINGER.
OR, PUT YOUR HAND DOWNWARD.

FIG. 5
SAY "CHANNEL UP" TO TURN UP THE CHANNEL
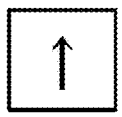 OR, TURN YOUR FACE UPWARD.
OR, POINT UPWARD WITH YOUR INDEX FINGER.
OR, PUT YOUR HAND UPWARD.
SAY "CHANNEL DOWN" TO TURN DOWN THE CHANNEL
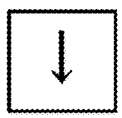 OR, TURN YOUR FACE DOWNWARD.
OR, POINT DOWNWARD WITH YOUR INDEX FINGER.
OR, PUT YOUR HAND DOWNWARD.

INFORMATION PROCESSING DEVICE, INFORMATION PROCESSING METHOD, AND COMPUTER PROGRAM

CROSS-REFERENCE TO RELATED APPLICATIONS

The present application is based on PCT filing PCT/JP2019/032184, filed Aug. 16, 2019, which claims priority to JP 2018-193999, filed Oct. 15, 2018, the entire contents of each are incorporated herein by reference.

TECHNICAL FIELD

The technology disclosed in the present description relates to an information processing device, an information processing method, and a computer program that assist a device operation of a user.

BACKGROUND ART

Recently, services called "voice agent", "assistant", or "smart speaker", which present various types of information to the user in accordance with their use and situation while having a dialogue with the user by using voice or the like have begun to spread. Use of a voice agent allows the user to issue a command by a natural interaction without a device such as a remote controller. Furthermore, if the voice agent is equipped with a camera, the user can issue a command by gesture. Moreover, it is also assumed that a command can be issued by connecting the voice agent with various devices in the home, such as a television device, a video recorder, audio equipment, lighting, an air conditioner, cooking equipment, the refrigerator, the washing machine, the bath, and the toilet. For example, there has been a proposal for a voice dialogue agent system that voice-controls a device related to consumer appliances by using a voice command (see Patent Document 1).

CITATION LIST

Patent Document

Patent Document 1: Japanese Patent Application Laid-Open No. 2018-120203

Non-Patent Document

Non-Patent Document 1: Prototypical Networks for Few-Shot Learning. Jake SNELL, Kevin Swersky, and Richard Zemel. NIPS 2017.

SUMMARY OF THE INVENTION

Problems to be Solved by the Invention

An object of the technology disclosed in the present description is to provide an information processing device, an information processing method, and a computer program that assist a device operation of a user.

Solutions to Problems

A first aspect of the technology disclosed in the present description is
an information processing device including:
an input unit that receives input from a user; and
a presentation unit that presents information regarding a command for operating a predetermined device on the basis of the input.

The input unit receives input by at least one of voice or gesture from a user, and the presentation unit presents a candidate of a command including at least one of voice or gesture.

The presentation unit presents a candidate of a command partially matching the input.

Alternatively, the information processing device further includes a storage unit that stores immediately preceding input for each command, in which the storage unit searches immediately preceding input similar to the input, and the presentation unit presents a candidate of a command corresponding to similar immediately preceding input.

Alternatively, the input unit receives a remote control command, and the presentation unit presents a gesture or voice command equivalent to the remote control command.

Alternatively, the presentation unit presents a plurality of device operations brought into one group, and presents a candidate of a command corresponding to the group.

Alternatively, the presentation unit presents one or a plurality of device operations frequently performed by the user, and presents a candidate of a gesture command corresponding to the device operation.

Furthermore, a second aspect of the technology disclosed in the present description is
an information processing method including:
an input step of receiving input from a user; and
a presentation step of presenting information regarding a command for operating a predetermined device on the basis of the input.

Furthermore, a third aspect of the technology disclosed in the present description is
a computer program described in a computer-readable format so as to cause a computer to function as
an input unit that receives input from a user, and
a presentation unit that presents information regarding a command for operating a predetermined device on the basis of the input.

The computer program according to the third aspect defines a computer program described in a computer-readable format so as to implement predetermined processing on a computer. In other words, by installing the computer program according to the third aspect in a computer, a cooperative action is exerted on a computer, and a similar action and effect to that of the information processing device according to the first aspect can be obtained.

Effects of the Invention

According to the technology disclosed in the present description, it is possible to provide an information processing device, an information processing method, and a computer program that assist a device operation of a user.

Note that the effects described in the present description are merely examples, and the effects of the present invention are not limited thereto. Furthermore, in some cases, the present invention has additional effects in addition to the above effects.

Other objects, features, and advantages of the technology disclosed in the present description will become apparent from a more detailed description based on the embodiments as described later and the accompanying drawings.

BRIEF DESCRIPTION OF DRAWINGS

FIG. 3 is a view showing a specific example of a GUI of gesture choices.

FIG. 4 is a view showing a specific example of a GUI of gesture choices.

FIG. 5 is a view showing a specific example of a GUI of gesture choices.

MODE FOR CARRYING OUT THE INVENTION

Embodiments of the technology disclosed in the present description will be described below in detail with reference to the drawings.

Figure 1:
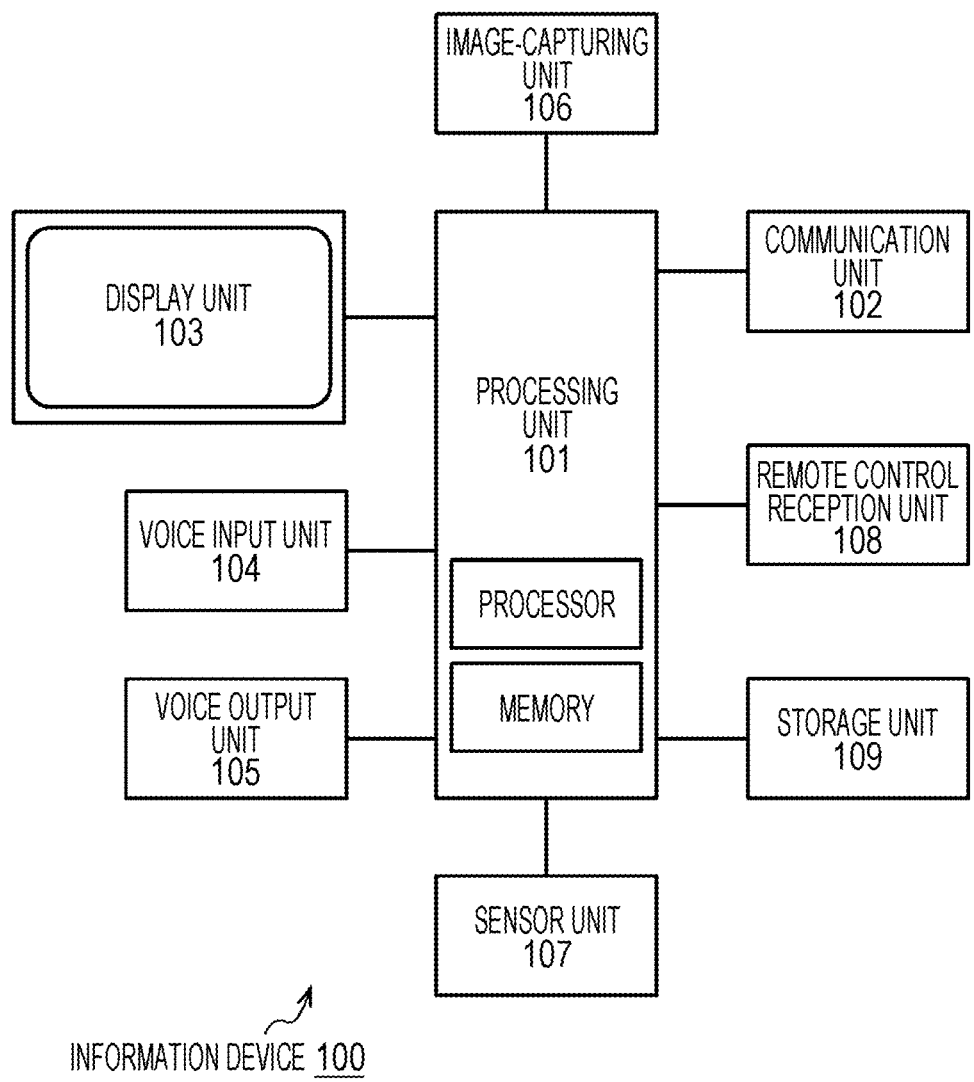
FIG. 1 is a diagram schematically showing a configuration example of an information device 100 capable of operating as a voice agent.

FIG. 1 schematically shows a configuration example of the information device 100 capable of operating as a voice agent. The information device 100 may be a dedicated agent device that operates as a voice agent, or may be a device in which a voice agent application is pre-installed such as various consumer electronics (CE) devices including a television device, an air conditioner, a video recorder, a washing machine, and the like, and Internet of things (IoT) devices.

The information device 100 includes a processing unit 101, a communication unit 102, a display unit 103, a voice input unit 104, a voice output unit 105, an image-capturing unit 106, a sensor unit 107, a remote control reception unit 108, and a storage unit 109.

The communication unit 102 is connected to an external network such as the Internet using wired communication such as Ethernet (registered trademark) or wireless communication such as Wi-Fi (registered trademark). Furthermore, the communication unit 102 may further include an interface function for connecting with an external device (not illustrated). For example, the communication unit 102 may further include an interface function for interconnecting with each home CE device and an interface function with an IoT device via a home network conforming to a standard such as Digital Living Network Alliance (DLNA) (registered trademark).

The display unit 103 includes, for example, a liquid crystal, organic electro-luminescence (EL) element, or the like. The display unit 104 can display, for example, a character of a voice agent, a partial match candidate (described later) of a command, or a message to the user. However, the display unit 103 is not an essential component for the information device 100 as a voice agent. For example, a display provided in another device such as a television device that can cooperate via the communication unit 102 may be substituted.

The voice input unit 104 includes a sound collection element such as a microphone, and is used for inputting voice generated in a room where the information device 100 is installed. The voice generated in the room can include an utterance (voice command) by a user using the voice agent. The voice input unit 104 may include a microphone array in which a plurality of microphones is combined. Some or all of the microphones may be externally connected to the information device 100. Alternatively, a microphone mounted on an external device cooperating with the information device 100, such as a smart phone or a wearable device, may be included.

The voice output unit 105 includes a sound generation element such as a speaker. The sound output unit 105 is mainly used for outputting synthesized voice from the voice agent. Furthermore, the voice output unit 106 may include a speaker array (multichannel speaker or ultra-multichannel speaker) in which a plurality of speakers is combined. Some or all of the plurality of speakers may be externally connected to the information device 100.

The image-capturing unit 106 includes a camera including an image sensor such as a complementary metal oxyde semiconductor (CMOS) or a charge coupled device (CCD), and captures an image of the user who is mainly in the front direction of the information device 100 and intends to issue a gesture or voice command. The image-capturing unit 106 may be, for example, a stereo camera using two cameras or a multi-lens camera using three or more cameras. Furthermore, some or all of the plurality of cameras may be externally connected to the information device 100.

The sensor unit 107 mainly senses environmental information in a room where the information device 100 is installed. The configuration of the sensor unit 107, i.e., what kind of sensor element to include, is free. For example, the sensor unit 107 may include an object detection sensor and a depth sensor. Furthermore, the sensor unit 107 may include an environmental sensor that detects environmental information, such as an illuminance sensor, a temperature sensor, and a humidity sensor. Furthermore, the sensor unit 107 may include an infrared sensor or a human sensor. Furthermore, the sensor unit 107 may include a biosensor that detects the pulse, sweating, electroencephalogram, myoelectric potential, exhalation, and the like of the user. Some or all of the sensor units constituting the sensor unit 107 may be externally connected or wirelessly connected to the information device 100.

The remote control reception unit 108 receives and processes a remote control signal transmitted from a remote controller (not illustrated) by using infrared communication, short-range wireless communication, or the like to generate an operation command. The operator of the remote controller is, for example, a user who intends to issue a command to the voice agent. Furthermore, the object to be operated by the remote controller is assumed to be not only the main body of the information device 100 but also an external device connected to the information device 100.

The storage unit 109 includes a large-capacity recording device such as a hard disc drive (HDD) or a solid state drive (SSD). For example, a huge amount of data such as a database and a dictionary used when carrying out the service of a voice agent is stored in the storage unit 109. In some cases, the storage unit 109 is externally connected or is added to the information device 100 via an interface such as a universal serial bus (USB).

The processing unit 101 includes a processor and a memory, and the processor executes a program loaded in the memory, performs various kinds of processing, and collectively controls the operation of the information device 100. In the processing unit 101, various applications are executed under an execution environment provided by the operating system (OS), basically. For example, in a case where a multiprocessor is available as a processor or in a case where multithread execution is enabled by the OS, all the processing units executable in parallel can be read into the memory and executed in parallel.

The processing unit 101 executes an application preinstalled in the processing unit 101, such as a voice agent. Furthermore, the processing unit 101 executes in parallel a plurality of agent applications, whereby the information device 100 can function as a plurality of agent devices. Furthermore, in some cases, at least some of the agent functions are provided in cooperation with an agent service built on the cloud.

First Embodiment

Use of a voice agent allows the user to issue a command by a natural interaction without a device such as a remote controller. Furthermore, if the voice agent is equipped with a camera, the user can issue a command by gesture. Moreover, it is also assumed that a command can be issued by connecting the voice agent with various devices in the home, such as a television device, a video recorder, audio equipment, lighting, an air conditioner, cooking equipment, the refrigerator, the washing machine, the bath, and the toilet.

However, when various devices are connected to the voice agent and an attempt is made to operate each device via the voice agent, the number of utterances and gestures corresponding to commands increases, and there is a concern that the user cannot remember all of them. Because the user's memory is ambiguous, there is a risk that a wrong utterance or gesture causes the device to malfunction or causes another device to operate.

Therefore, as the first embodiment, a few methods for the user to realize, by a simple interaction without error, the operation of a desired device in a voice agent to which various devices are connected will be proposed.

As the first method, there is proposed a method of assisting, in a case where a command from the user is imperfect, the command issuance of the user by presenting a candidate partially matching a registered command via the speaker (voice output unit 105) or the display (display unit 103). This method has an advantage that the user can issue a desired command even if the command by gesture or utterance is half-remembered.

As an example, when uttering only "Volume", the user finds "Up" and "Down" as candidates by partial match search. Then, when these partial match candidates are found, "Up" and "Down" are presented on the left and right on the screen. The screen may be a screen of a display mounted on the voice agent main body or a screen of a device cooperating with the voice agent such as a television device. Then, if the user makes a gesture indicating either "left" or "right", the voice agent can specify as to which of Volume Up or Volume Down the user command is, and hence the user can implement the command by a simple interaction.

As another example, when uttering only "Up", the user finds "Volume", "Channel", and the like as candidates by partial match search. Then, when these partial match candidates are found, each candidate is displayed on the screen. By performing a subsequent operation by utterance or gesture in accordance with the display of the screen, the user can implement the command by interaction.

Furthermore, as an extended example, when the user utters "Ota Ward, tell me the weather and temperature this evening" in the morning, for example, only "Ota Ward" is subjected to partial match search, and the resultant partial match candidates "Morning", "Noon", "Night", "Weather", "Temperature", and "Congestion" are displayed on the screen. Thereafter, the user can respond only with gestures.

The first method is characterized mainly in enabling processing of an imperfect user command by utilizing partial match search and in assisting user command input by multimodal interaction.

Figure 2:
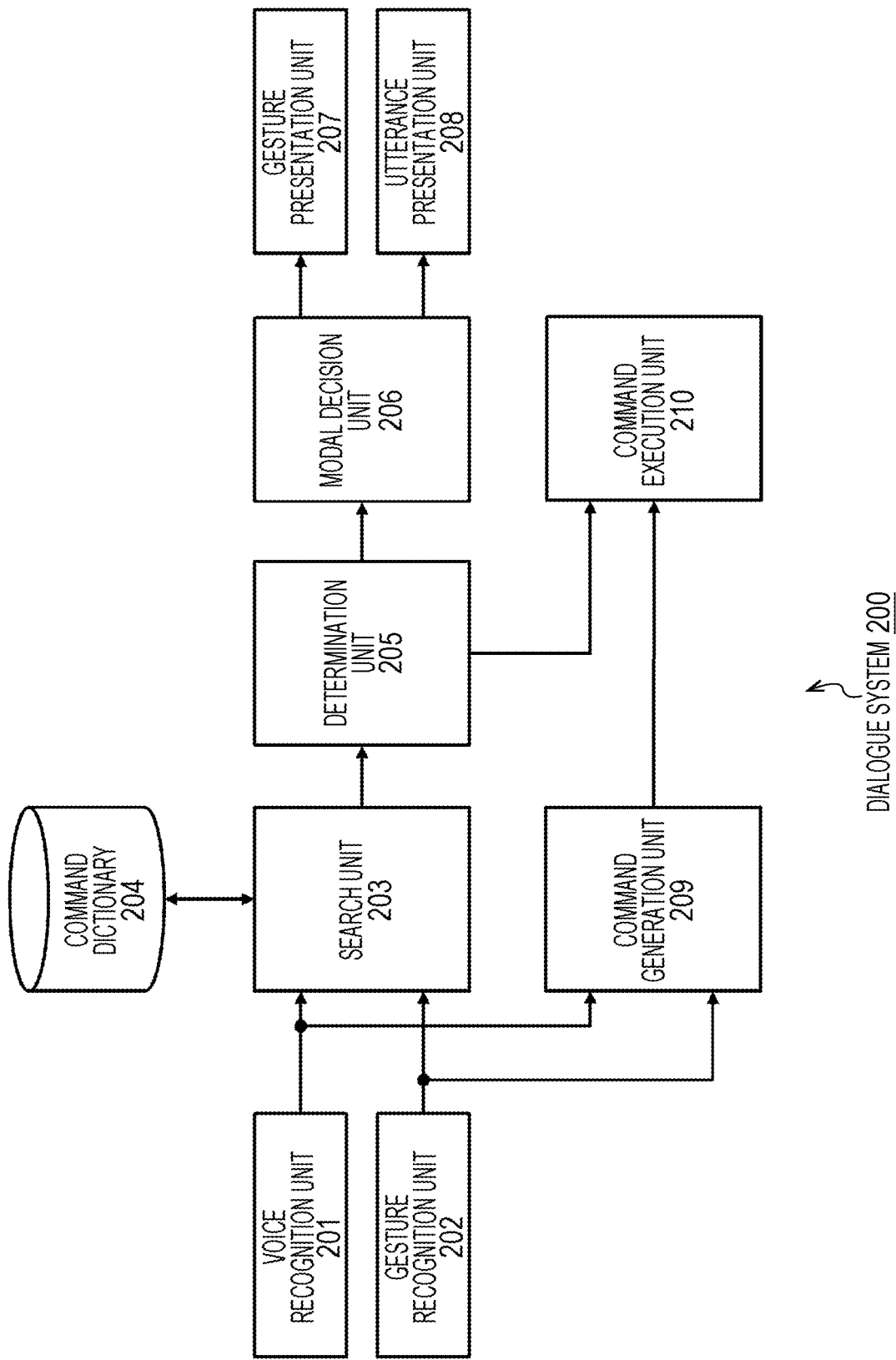
FIG. 2 is a diagram showing a functional configuration example of a dialogue system 200.

FIG. 2 shows a functional configuration example of the dialogue system 200 utilizing partial match search and multimodal interaction. The dialogue system 200 is implemented in the form of executing a predetermined voice agent application on the information device 100 shown in FIG. 1, for example.

The dialogue system 200 shown in FIG. 2 includes a voice recognition unit 201, a gesture recognition unit 202, a search unit 203, a command dictionary 204, a determination unit 205, a modal decision unit 206, a gesture presentation unit 207, an utterance presentation unit 208, a command generation unit 209, and a command execution unit 210. Some or all of these components are configured as software modules, for example.

The voice recognition unit 201 recognizes the user's voice input from the microphone such as the voice input unit 104, and converts it into text (character string). For example, the user inputs a command by voice, but the command by voice is assumed to be imperfect.

The gesture recognition unit 202 recognizes a gesture category from an image of the user captured by the image-capturing unit 106 or the like, and converts it into text (character string). For example, the gesture made by the user is assumed to be imperfect.

The search unit 203 searches the text in the command dictionary 204 for the character string input from the voice recognition unit 201. A character string of a command defined in the dialogue system 200 is registered in the command dictionary 204. It is also assumed that the character string input from the voice recognition unit 201 is interrupted in the middle and unintelligible or is imperfect. The present embodiment is characterized in that the search unit 203 performs a partial match search or a similarity search even if the input character string is imperfect.

Furthermore, the search unit 203 searches a corresponding command from the gesture type recognized by the gesture recognition unit 202. Gesture patterns are registered in the command dictionary 204. It is also assumed that the gesture recognized by the gesture recognition unit 202 is interrupted in the middle and unintelligible or is imperfect. The present embodiment is characterized in that the search unit 203 performs a partial match search or a similarity search even if the gesture made by the user is imperfect.

The determination unit 205 determines a command intended by the user on the basis of the search result of the voice command and gesture by the search unit 203. Furthermore, in a case where the search unit 203 only gives a partially matching search result of the voice command and gesture and fails to give a perfect command, the determination unit 205 performs prediction and interpolation and outputs a plurality of command candidates (partial match candidates).

In a case where the determination unit 205 is not capable of determining a perfect command, the modal decision unit 206 decides a modal for prompting the user to narrow down a command from among the plurality of command candidates (partial match candidates). In the dialogue system 200 shown in FIG. 2, gesture and voice are available as two types of modal in which the user inputs a command, but other types of modal may be supported. In a case where it is decided that the command candidates by the gesture of the user is narrowed down, the modal decision unit 206 instructs the gesture presentation unit 207 to present a gesture for prompting the narrowing down of the command candidates. Furthermore, in a case where it is decided that the command candidates by the voice of the user is narrowed down, the modal decision unit 206 instructs the utterance presentation unit 208 to present an utterance content for prompting the narrowing down of the command candidates.

The gesture presentation unit 207 presents gestures for selecting each command candidate to the user, and prompts the user to narrow down the command candidates by making any of the gestures. For example, using the display unit 103 (or the screen of a television device cooperating with the dialogue system 200 or the like), the gesture presentation unit 207 displays a graphical user interface (GUI) on which the gesture for each command candidate is presented, and prompts the user to make any of the gestures. Alternatively, by outputting voice guidance explaining the gesture for each command candidate from the voice output unit 105, the gesture presentation unit 207 may prompt the user to make any of the gestures to narrow down the command candidates.

The utterance presentation unit 208 presents utterance contents for selecting each command candidate to the user, and prompts the user to narrow down the command candidates by uttering any of them. For example, using the display unit 103 (or the screen of a television device cooperating with the dialogue system 200 or the like), the utterance presentation unit 208 displays a GUI on which the utterance content for each command candidate is presented, and prompts the user to utter any of them. Alternatively, by outputting voice guidance explaining the utterance content for each command candidate from the voice output unit 105, the utterance presentation unit 208 may prompt the user to narrow down the command candidates by uttering any of them.

The command generation unit 209 generates a perfect command from an imperfect command sequentially output from one or both of the voice recognition unit 201 and the gesture recognition unit 202. Specifically, the command generation unit 209 manages the status of the interaction between the dialogue system 200 and the user, and on the basis of the current status, generates a command by merging the information previously output from the voice recognition unit 201 or the gesture recognition unit 202 with the information newly output from the voice recognition unit 201 or the gesture recognition unit 202.

The command execution unit 210 executes a perfect command determined by the determination unit 205 or a command generated from an imperfect command by the command generation unit 209. The command includes not only a command for the dialogue system 200 but also a command for an external device. In the former case, in the information device 100, which is the entity of the dialogue system 200, the processing unit 101 executes processing of the command. Furthermore, in the latter case, the command is transmitted to the corresponding external device via the communication unit 102, for example.

In the dialogue system 200 shown in FIG. 2, the determination unit 205 is brought into a state of being incapable of determining the perfect command, in a case where the voice command of the user input from the microphone is imperfect (e.g., in a case of being interrupted in the middle or fragmented) or in a case where the gesture made by the user is imperfect (e.g., in a case where the motion is not correct, or the camera fails to capture part of the gesture behind an obstacle). The modal decision unit 206 decides which modal of gesture or voice to use to prompt the user to narrow down the commands.

For example, the modal decision unit 206 may prompt narrowing down of the command candidates by the gesture presentation unit 207 when the user inputs a (imperfect) gesture command, or may prompt narrowing down of the command candidates by the utterance presentation unit 208 when the user inputs a (imperfect) voice command, i.e., narrowing down of the command candidates may be performed in the same modal.

For example, the modal decision unit 206 may prompt narrowing down of the command candidates by the utterance presentation unit 208 when the user inputs a (imperfect) gesture command, or may prompt narrowing down of the command candidates by the gesture presentation unit 207 when the user inputs a (imperfect) voice command, i.e., narrowing down of the command candidates may be performed in the switched modal.

The modal decision unit 206 switches the modal to a modal different from that at the time of the first command input, thereby being capable of indicating to the user the modal available in the dialogue system 200. For example, a user who has ever made command input only by utterance sometimes comes to know that he or she can use gesture, and inversely, a user who has ever made command input only by gesture sometimes comes to make input by utterance. Of course, on the assumption of a circumstance in which the user cannot make a perfect gesture or cannot make a perfect utterance, the modal decision unit 206 may select a modal different from that at the time of the first command input. For example, the modal may be switched to gesture in a case where there is a circumstance in which the utterance of the user cannot be recognized with sufficient accuracy, and the modal may be switched to utterance in a case where the camera fails to capture part of gesture behind an obstacle at the current position of the user.

FIG. 3 shows a specific example of the GUI of gesture choices presented by the gesture presentation unit 207. Here, it is assumed that in a previous interaction between the dialogue system 200 and the user, the user utters only "Up", and the dialogue system 200 finds "Volume" and "Channel" as candidates by partial match search.

In the GUI illustrated in FIG. 3, command candidates obtained by partial matching are listed, and gestures for indicating the respective command candidates are each presented. This GUI displays up, down, left, and right arrows, where a rightward gesture indicates "channel up" (switching to a larger channel number), a leftward gesture indicates "channel down" (switching to a smaller channel number), an upward gesture indicates turning up the volume, and a downward gesture indicates turning down the volume. The gesture may be a motion of shaking the head or swinging the hand or fingertip.

The command generation unit 209 manages the status of the interaction in which the user has previously uttered only "Up", and on the basis of the current status, i.e., the gesture the user has made to the GUI shown in FIG. 3, the command generation unit 209 is capable of generating a perfect command by merging "Up" with the channel or volume. Therefore, the GUI shown in FIG. 3 can assist the user in operating the device.

FIG. 4 shows another specific example of the GUI of gesture choices presented by the gesture presentation unit 207. Here, it is assumed a case in which after uttering only "Voice", the user got annoyed and shut up, and the gesture presentation unit 207 uses the display unit 103 to prompt the user for subsequent input.

The GUI illustrated in FIG. 4 displays a message "Say "Volume Up" to turn up the volume". In a case where the user utters "Volume Up" in response to the message, the command "Volume Up" is subjected to voice recognition by the voice recognition unit 201, the search unit 203 searches the command dictionary 204 for the text "Volume Up", the determination unit 205 determines, on the basis of the search result, that the utterance of the user is "Volume Up", and the command execution unit 210 executes the "Volume Up" command.

Furthermore, in a case where the user utters only "Up" to the GUI illustrated in FIG. 4, the command generation unit 209 manages the status of the interaction that the user has previously uttered only "Voice", and, on the basis of the current status in which the user has further uttered "Up", the command generation unit 209 merges "Voice" with "Up" to generate the final command "Volume Up", and this command can be executed by the command execution unit 210.

Furthermore, the GUI illustrated in FIG. 4 displays messages "Or, turn your face upward", "Or, point upward with your index finger", and "Or, put your hand upward", along with the message "Say "Volume Up" to turn up the volume". That is, the modal decision unit 206 shows modal switching from utterance to gesture. For example, it is possible for a user who has ever made command input only by utterance to know that he or she can use gesture. Suppose that in response to any of these messages, the user makes any of the following gestures: turning the face upward; pointing upward with the index finger; and putting the hand upward. Although none of these gestures is a perfect command, the command generation unit 209 manages the status of the interaction that the user has previously uttered only "Voice" and, on the basis of the current status that the user has further made any gesture meaning "Up", the command generation unit 209 merges "Voice" with "Up" to generate the final command "Volume Up", and this command can be executed by the command execution unit 210. Therefore, the GUI shown in FIG. 4 can assist the user in operating the device.

FIG. 5 shows yet another specific example of the GUI of gesture choices presented by the gesture presentation unit 207. Here, it is assumed a case in which after uttering only "Channel", the user got annoyed and shut up, and the gesture presentation unit 207 uses the display unit 103 to prompt the user for subsequent input.

The GUI illustrated in FIG. 5 displays a message "Say "Channel Up" to turn up the channel". In a case where the user utters "Channel Up" in response to the message, the command "Channel Up" is subjected to voice recognition by the voice recognition unit 201, the search unit 203 searches the command dictionary 204 for the text "Channel Up", the determination unit 205 determines, on the basis of the search result, that the utterance of the user is "Channel Up", and the command execution unit 210 executes the "Channel Up" command.

Furthermore, in a case where the user utters only "Up" to the GUI illustrated in FIG. 5, the command generation unit 209 manages the status of the interaction that the user has previously uttered only "Channel", and, on the basis of the current status in which the user has further uttered "Up", the command generation unit 209 merges "Channel" with "Up" to generate the final command "Channel Up", and this command can be executed by the command execution unit 210.

Furthermore, the GUI illustrated in FIG. 5 displays messages "Or, turn your face upward", "Or, point upward with your index finger", and "Or, put your hand upward", along with the message "Say "Channel Up" to turn up the channel". That is, the modal decision unit 206 shows modal switching from utterance to gesture. For example, it is possible for a user who has ever made command input only by utterance to know that he or she can use gesture. Suppose that in response to any of these messages, the user makes any of the following gestures: turning the face upward; pointing upward with the index finger; and putting the hand upward. Although none of these gestures is a perfect command, the command generation unit 209 manages the status of the interaction that the user has previously uttered only "Channel" and, on the basis of the current status that the user has further made any gesture meaning "Up", the command generation unit 209 merges "Channel" with "Up" to generate the final command "Channel Up", and this command can be executed by the command execution unit 210. Therefore, the GUI shown in FIG. 5 can assist the user in operating the device.

Figure 6:
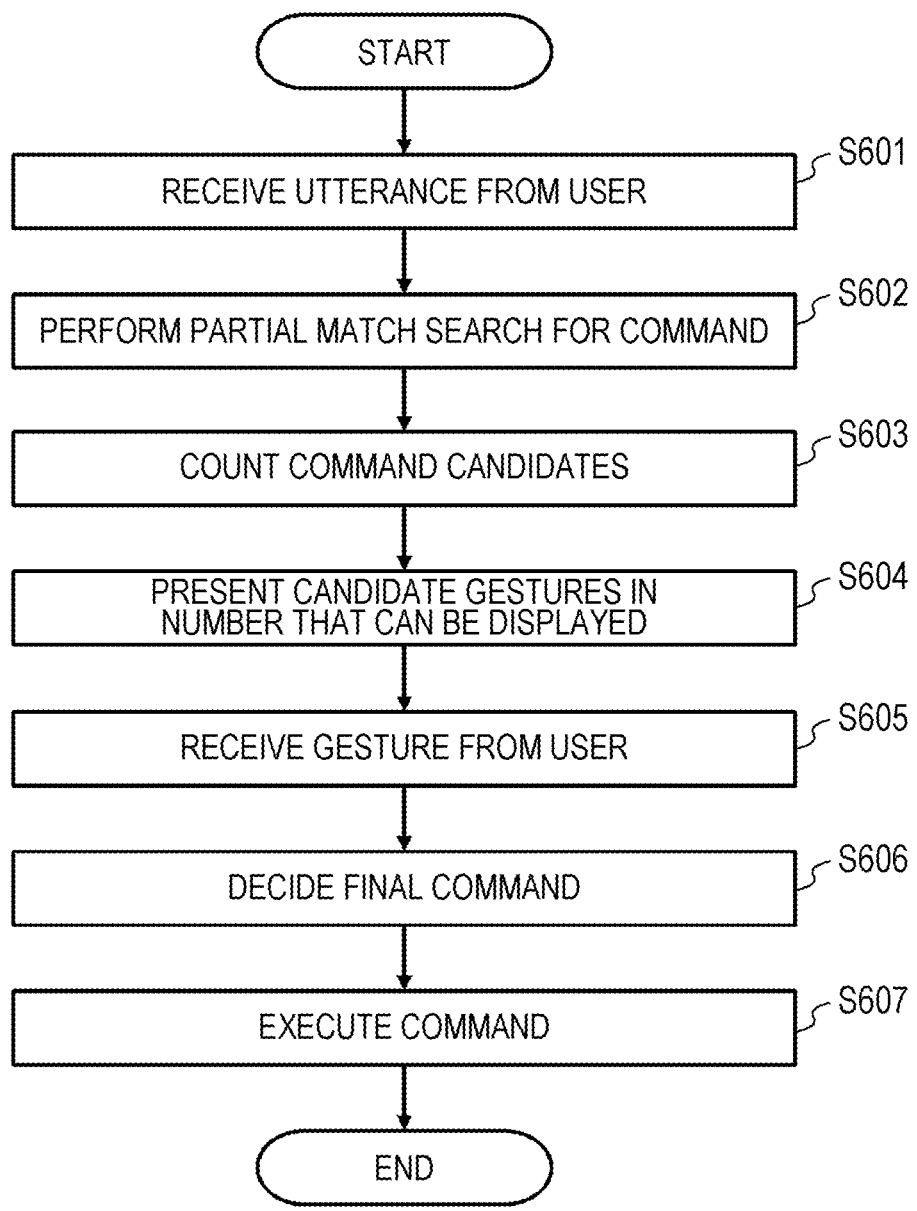
FIG. 6 is a flowchart showing an example of a processing procedure executed by the dialogue system 200 at the time of interaction with the user.

FIG. 6 shows an example of the processing procedure executed by the dialogue system 200 at the time of interaction with the user.

First, an utterance from the user is received via the voice input unit 104 (step S601). The voice recognition unit 201 subjects the user's utterance to voice recognition. Then, the search unit 203 searches the command dictionary 204 for partial match of the voice-recognized text (step S602).

The search unit 203 or the determination unit 205 counts the number of command candidates that partially match the utterance from the user (step S603). When the modal decision unit 206 decides to perform narrowing down of the command candidates by gesture, the gesture presentation unit 207 checks whether or not the number of command candidates searched for partial match can be displayed on the display unit 103. Then, using the display unit 103 or the voice output unit 105, the gesture presentation unit 207 presents a displayable number of command candidate gestures (step S604).

The user selects from the list of command candidates presented by the display unit 103 and makes a gesture. Then, the gesture from the user is captured by the image-capturing unit 106, and the gesture recognition unit 202 estimates the gesture from the recognition result of the captured image of the user (step S605).

The command generation unit 209 manages the utterance received from the user in step S601 as the status of a previous interaction, and merges the utterance with the gesture estimated in the current status, i.e., in step S605, to generate the final command (step S606). Then, the command execution unit 210 executes the generated command (step S607).

Therefore, according to the processing procedure shown in FIG. 6, the user can carry out the operation of the desired device with a simple interaction by the assist of the dialogue system 200. Furthermore, in the processing procedure shown in FIG. 6, the modal decision unit 206 performs modal switching from utterance to gesture when narrowing down the command candidates. For example, it is possible for a user who has ever made command input only by utterance to know that he or she can use gesture.

Figure 7:
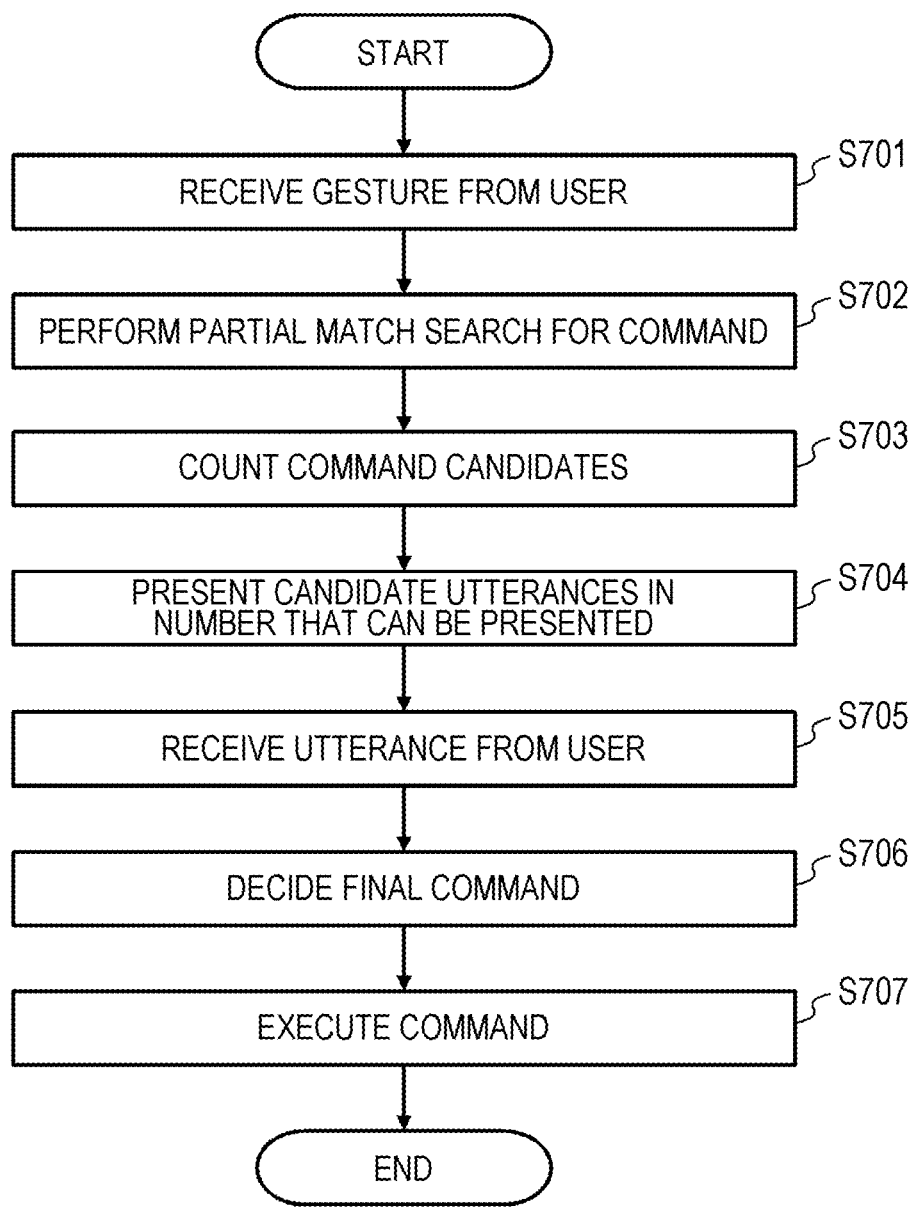
FIG. 7 is a flowchart showing another example of a processing procedure executed by the dialogue system 200 at the time of interaction with the user.

FIG. 7 shows another example of the processing procedure executed by the dialogue system 200 at the time of interaction with the user.

First, a gesture from the user is received via the image-capturing unit 106 (step S701). The gesture recognition unit 202 recognizes the gesture of the user. Then, the search unit 203 searches the command dictionary 204 for partial match of the recognized gesture category (step S702).

The search unit 203 or the determination unit 205 counts the number of command candidates that partially match the gesture from the user (step S703). When the modal decision unit 206 decides to perform narrowing down of the command candidates by utterance, the utterance presentation unit 207 checks whether or not the number of command candidates searched for partial match can be presented. Then, using the display unit 103 or the voice output unit 105, the utterance presentation unit 207 presents a displayable number of command candidate utterances (step S704).

The user selects from the presented command candidates and makes an utterance. Then, the utterance from the user is input by the voice input unit 104, and the voice recognition unit 201 subjects the user's utterance to voice recognition (step S705).

The command generation unit 209 manages the gesture received from the user in step S701 as the status of a previous interaction, and merges the gesture with the text subjected to voice recognition in the current status, i.e., in step S705, to generate the final command (step S706). Then, the command execution unit 210 executes the generated command (step S707).

Therefore, according to the processing procedure shown in FIG. 7, the user can carry out the operation of the desired device with a simple interaction by the assist of the dialogue system 200. Furthermore, in the processing procedure shown in FIG. 7, the modal decision unit 206 performs modal switching from gesture to utterance when narrowing down the command candidates. For example, it is possible for a user who has ever made command input only by gesture to know that he or she can use utterance.

Figure 8:
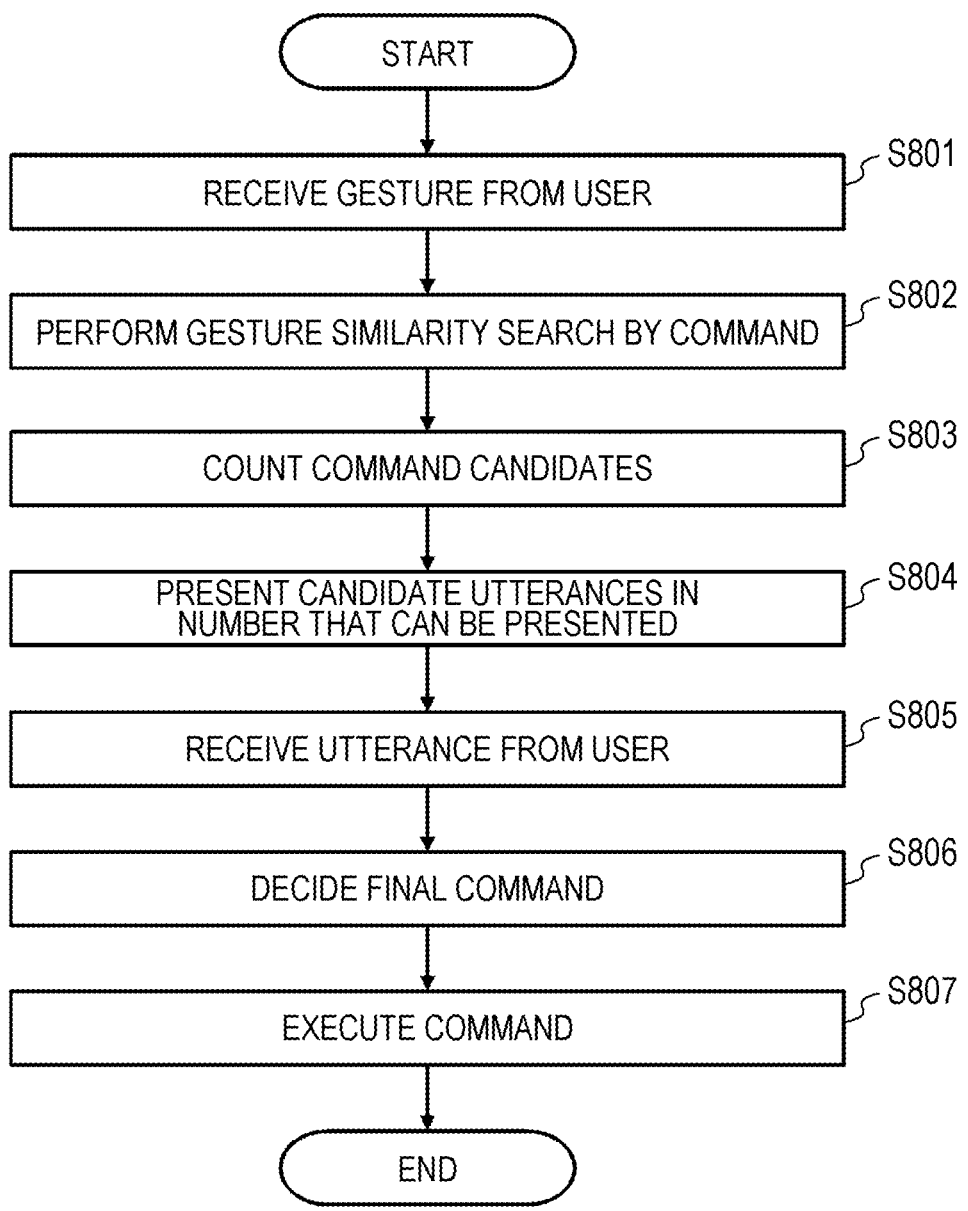
FIG. 8 is a flowchart showing another example of a processing procedure executed by the dialogue system 200 at the time of interaction with the user.

FIG. 8 shows yet another example of the processing procedure executed by the dialogue system 200 at the time of interaction with the user.

First, a gesture from the user is received via the image-capturing unit 106 (step S801). The gesture recognition unit 202 recognizes the gesture of the user. Then, the search unit 203 performs gesture similarity search by command (step S802).

The search unit 203 or the determination unit 205 counts the number of command candidates that partially match the gesture from the user (step S803). When the modal decision unit 206 decides to perform narrowing down of the command candidates by utterance, the utterance presentation unit 207 checks whether or not the number of command candidates searched for partial match can be presented. Then, using the display unit 103 or the voice output unit 105, the utterance presentation unit 207 presents a displayable number of command candidate utterances (step S804).

The user selects from the presented command candidates and makes an utterance. Then, the utterance from the user is input by the voice input unit 104, and the voice recognition unit 201 subjects the user's utterance to voice recognition (step S805).

The command generation unit 209 manages the gesture received from the user in step S701 as the status of a previous interaction, and merges the gesture with the text subjected to voice recognition in the current status, i.e., in step S805, to generate the final command (step S806). Then, the command execution unit 210 executes the generated command (step S807).

Therefore, according to the processing procedure shown in FIG. 8, the user can carry out the operation of the desired device with a simple interaction by the assist of the dialogue system 200.

Subsequently, a second method for the user to realize the operation of a desired device by a simple interaction without error will be described.

The second method is a method in which even in a state where there is no interaction from the user yet, a registered command is presented to the user in accordance with the motions, habits, and situations of the user, and the user is assisted in issuing the command. This method has an advantage that the user can issue a command simply by selecting from commands required for device operation that are presented to the user, even without issuing a command by gesture or voice.

As an example, in a case where it is found that the user tends to perform a channel operation or volume operation when he or she leans forward, the fact that the user leans forward itself is stored as a kind of gesture. Similarly, in a case where the user tends to utter a particular word immediately before performing a channel operation or volume operation, the user's utterance itself is stored as a kind of voice command. Then, the user's motion and utterance are constantly monitored, and when a stored motion or utterance appears, a subsequent utterance command or gesture command is presented to assist the command selection of the user. Therefore, the user can implement the command by a simple interaction.

Figure 9:
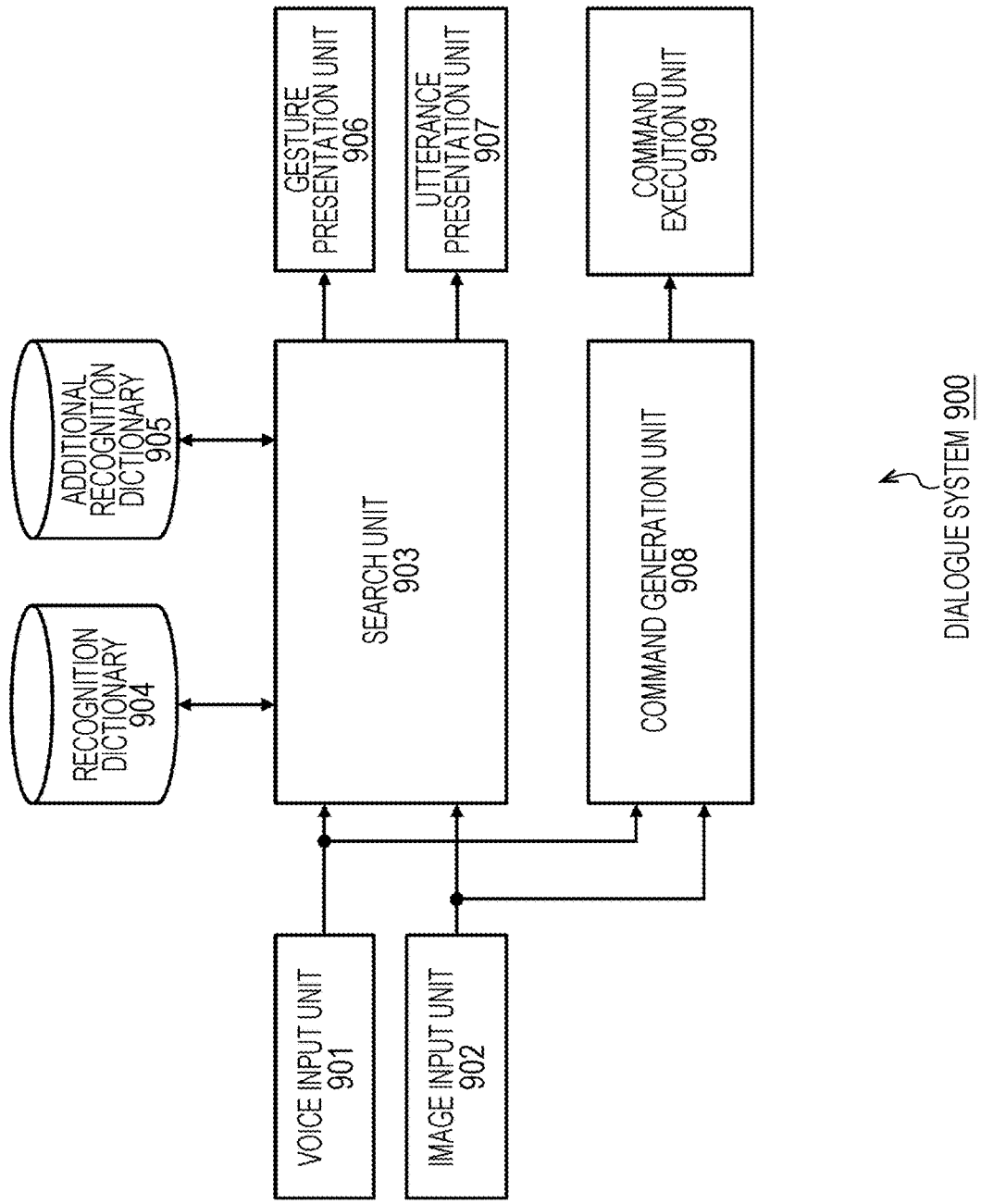
FIG. 9 is a diagram showing a functional configuration example of a dialogue system 900.

FIG. 9 shows a functional configuration example of the dialogue system 900 that assists the user in issuing a command in accordance with the motions, habits, and situations of the user. The dialogue system 900 is implemented in the form of executing a predetermined voice agent application on the information device 100 shown in FIG. 1, for example.

The dialogue system 900 shown in FIG. 9 includes a voice input unit 901, an image input unit 902, a search unit 903, a recognition dictionary 904, an additional recognition dictionary 905, a gesture presentation unit 906, an utterance presentation unit 907, a command generation unit 908, and a command execution unit 909. Some or all of these components are configured as software modules, for example.

The voice input unit 901 and the image input unit 902 can be configured using, for example, the voice input unit 104 and the image-capturing unit 106 of the information device 100, respectively. Unlike the dialogue system 200 shown in FIG. 2, the dialogue system 900 shall input not the voice recognition result or the gesture recognition result but the voice itself and the image itself.

The recognition dictionary 904 stores existing utterance commands and gesture commands. Furthermore, the additional recognition dictionary 905 stores the voice and motion immediately before the user performs a command issuance or a device operation (channel operation, volume operation, and the like).

The search unit 903 performs a similarity search of the utterance command candidates and gesture command candidates from the recognition dictionary 904 and the additional recognition dictionary 905 for the user's voice and the user's image input to the voice input unit 901 and the image input unit 902.

The gesture presentation unit 906 presents gestures for selecting each command candidate to the user, and prompts the user to narrow down the command candidates by making any of the gestures. For example, using the display unit 103 (or the screen of a television device cooperating with the dialogue system 900 or the like), the gesture presentation unit 906 displays a GUI on which the gesture for each command candidate is presented, and prompts the user to make any of the gestures. Alternatively, by outputting voice guidance explaining the gesture for each command candidate from the voice output unit 105, the gesture presentation unit 906 may prompt the user to make any of the gestures to narrow down the command candidates.

The utterance presentation unit 907 presents utterance contents for selecting each command candidate to the user, and prompts the user to narrow down the command candidates by uttering any of them. For example, using the display unit 103 (or the screen of a television device cooperating with the dialogue system 900 or the like), the utterance presentation unit 907 displays a GUI on which the utterance content for each command candidate is presented, and prompts the user to utter any of them. Alternatively, by outputting voice guidance explaining the utterance content for each command candidate from the voice output unit 105, the utterance presentation unit 907 may prompt the user to narrow down the command candidates by uttering any of them.

The command generation unit 908 generates a command from the user's voice and the user's image input to the voice input unit 901 and the image input unit 902. A command is generated by the command generation unit 908 in a case where the user's voice or the user's image input to the voice input unit 901 or the image input unit 902, for example, corresponds to an existing utterance command or gesture command stored in the recognition dictionary 904.

The command execution unit 909 executes the command generated by the command generation unit 908. The command includes not only a command for the dialogue system 900 but also a command for an external device. In the former case, in the information device 100, which is the entity of the dialogue system 900, the processing unit 101 executes processing of the command. Furthermore, in the latter case, the command is transmitted to the corresponding external device via the communication unit 102, for example.

Figure 10:
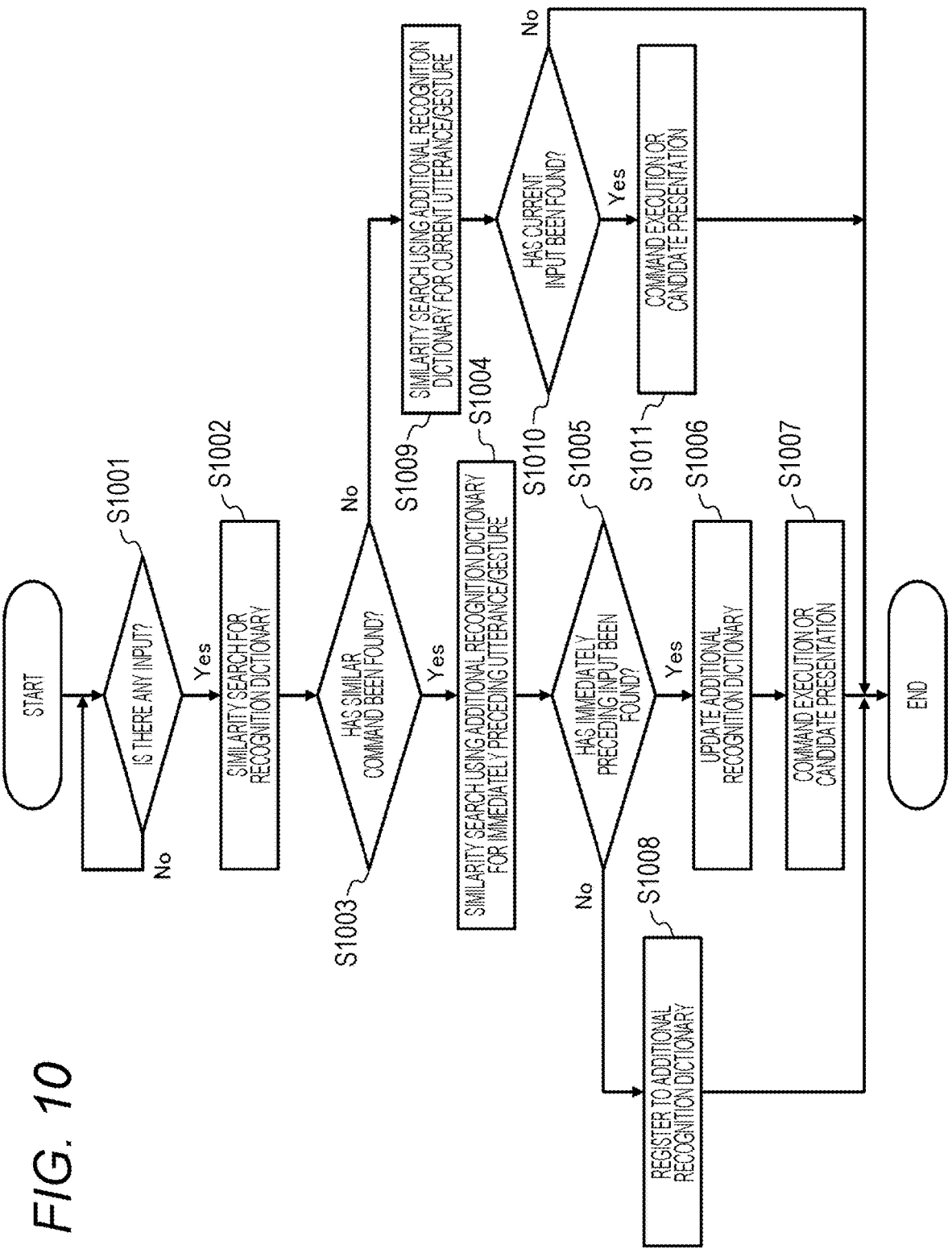
FIG. 10 is a flowchart showing an operation procedure in a search unit 903.

FIG. 10 shows the operation procedure in the search unit 903 in the form of a flowchart. It is assumed, however, that voices and images are constantly input from the voice input unit 901 and the image input unit 902 to the search unit 903, and the voices and images input from the voice input unit 901 and the image input unit 902 are stored for a certain period of time.

When there is an input from the voice input unit 901 or the image input unit 902 (Yes in step S1001), the search unit 903 performs a similarity search of the recognition dictionary 904 for the input voice or image (step S1002).

Here, in a case where an existing utterance command or gesture command similar to the voice or image input in step S1001 is found in the recognition dictionary 904 (Yes in step S1003), the search unit 903 performs a further similarity search of the additional recognition dictionary 904 for the utterance or gesture input immediately before from the voice input unit 901 or the image input unit 902 (step S1004).

In a case where the utterance or gesture input immediately before the command exists in the additional recognition dictionary 904 (Yes in step S1005), the search unit 903 updates the data of the voice or image immediately before that corresponds to the command hit in step S903 in the additional recognition dictionary 904 with the newly input data (step S1006). Then, the command generated by the command generation unit 908 on the basis of the voice or image input in step S901 is executed by the command execution unit 909, or the gesture command and utterance command candidates are presented in the gesture presentation unit 906 and the utterance presentation unit 907, respectively, to prompt the user to input the gesture command and the utterance command (step S1007).

Furthermore, in a case where the voice or image input immediately before the command does not exist in the additional recognition dictionary 904 (No in step S1005), the search unit 903 adds the input voice or image to the additional recognition dictionary 904 as the utterance or gesture immediately before the command (S1008).

On the other hand, in a case where an existing utterance command or gesture command similar to the voice or image input in step S1001 does not exist in the recognition dictionary 904 (No in step S1003), the search unit 903 performs a similarity search of the additional registration dictionary 905 for the utterance or gesture input currently (S1009). Then, in a case where the utterance or gesture input currently exists in the additional registration dictionary 905 (Yes in step S1010), the command execution unit 909 executes the utterance command or gesture command, or the gesture command and utterance command candidates are presented in the gesture presentation unit 906 and the utterance presentation unit 907, respectively, to prompt the user to input the gesture command and the utterance command (step S1011).

In particular, an approach of one-shot learning shall be used when the utterance or motion immediately before the command is registered in the additional recognition dictionary 905 or when the utterance or motion is collated with the recognition dictionary 904 or the additional recognition dictionary 905.

Figure 11:
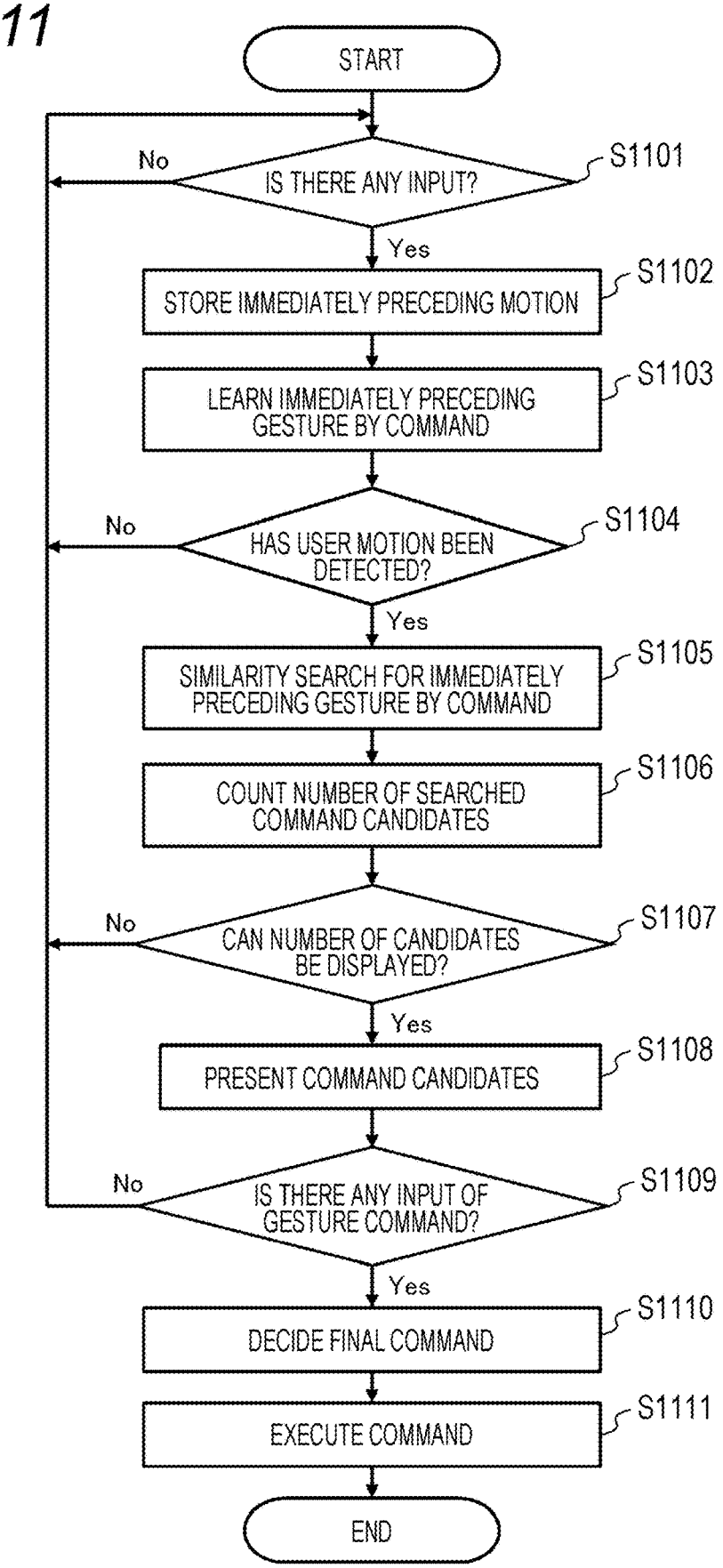
FIG. 11 is a flowchart showing an example of a processing procedure executed by the dialogue system 900 at the time of interaction with the user.

FIG. 11 shows an example of the processing procedure executed by the dialogue system 900 at the time of interaction with the user. It is assumed, however, that voices and images are constantly input from the voice input unit 901 and the image input unit 902 to the search unit 903, and the voices and images input from the voice input unit 901 and the image input unit 902 are stored for a certain period of time.

When there is a user input (utterance or gesture) from the voice input unit 901 or the image input unit 902 (Yes in step S1101), the search unit 903 stores the immediately preceding motion (input image) (step S1102).

Next, the search unit 903 learns the immediately preceding gesture by command and stores it into the additional authentication dictionary 905 (step S1103).

Next, when detecting the motion of the user (Yes in step S1104), the search unit 903 performs a similarity search of the additional recognition dictionary 905 for the immediately preceding gesture by command (step S1105).

The search unit 903 counts the number of command candidates searched from the additional recognition dictionary 905 on the basis of the immediately preceding gesture (step S1106). Then, if the number of searched command candidates can be displayed on the display unit 103 (Yes in step S1107), the candidate gestures are presented on the display unit 103 (step S1108). Furthermore, in a case where the number of searched command candidates exceeds the number that can be displayed on the display unit 103 (No in step S1107), the process returns to step S1101 and waits for the next user input.

The gesture command candidates are presented on the display unit 103, thereby prompting the user to input the gesture. Then, when a gesture command from the user is received via the image input unit 902 (Yes in step S1109), the command generation unit 908 decides the final command (step S1110), and the command execution unit 909 executes the command (step S1111). Furthermore, in a case where there is no gesture command from the user (No in step S1109), the process returns to step S1101 and waits for the next user input.

Therefore, according to the processing procedure shown in FIG. 11, the user can carry out the operation of the desired device with a simple interaction by the assist of the dialogue system 900, with the necessary command presented before making an utterance or gesture.

Figure 12:
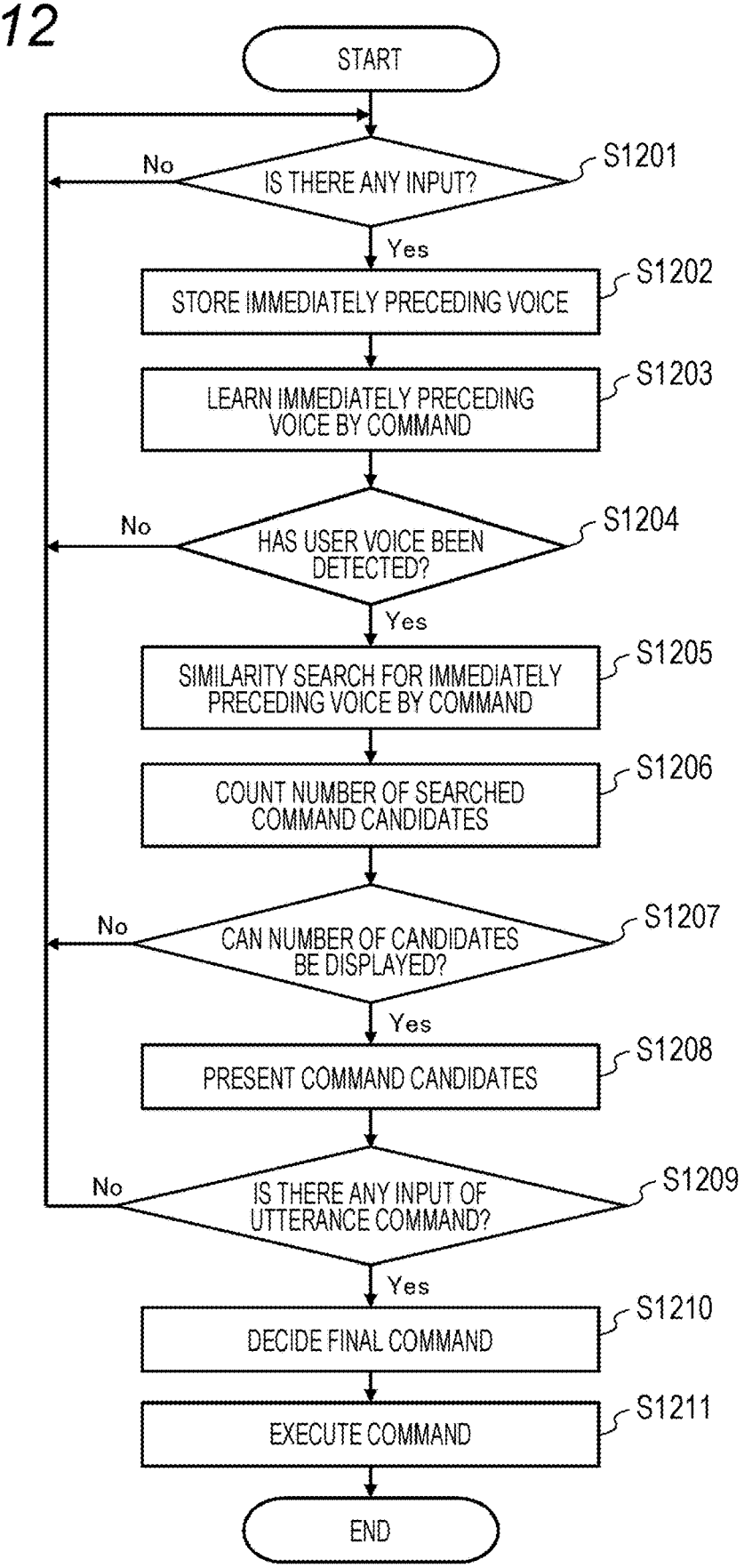
FIG. 12 is a flowchart showing another example of a processing procedure executed by the dialogue system 900 at the time of interaction with the user.

FIG. 12 shows another example of the processing procedure executed by the dialogue system 900 at the time of interaction with the user. It is assumed, however, that voices and images are constantly input from the voice input unit 901 and the image input unit 902 to the search unit 903, and the voices and images input from the voice input unit 901 and the image input unit 902 are stored for a certain period of time.

When there is a user input (utterance or gesture) from the voice input unit 901 or the image input unit 902 (Yes in step S1201), the search unit 903 stores the immediately preceding voice (step S1202). The immediately preceding voice mentioned here shall include verbal ones and non-verbal ones.

Next, the search unit 903 learns the immediately preceding voice by command and stores it into the additional authentication dictionary 905 (step S1203).

Next, when detecting the voice of the user (Yes in step S1204), the search unit 903 performs a similarity search of the additional recognition dictionary 905 for the immediately preceding voice by command (step S1205).

The search unit 903 counts the number of command candidates searched from the additional recognition dictionary 905 on the basis of the immediately preceding voice (step S1206). Then, if the number of searched command candidates can be displayed on the display unit 103 (Yes in step S1207), the candidate voices are presented on the display unit 103 (step S1208). Furthermore, in a case where the number of searched command candidates exceeds the number that can be displayed on the display unit 103 (No in step S1207), the process returns to step S1101 and waits for the next user input.

The utterance command candidates are presented on the display unit 103, thereby prompting the user to input the gesture. Then, when a gesture command from the user is received via the image input unit 902 (step S1209), the command generation unit 908 decides the final command (step S1210), and the command execution unit 909 executes the command (step S1211). Furthermore, in a case where there is no utterance command from the user (No in step S1109), the process returns to step S1101 and waits for the next user input.

Therefore, according to the processing procedure shown in FIG. 12, the user can carry out the operation of the desired device with a simple interaction by the assist of the dialogue system 900, with the necessary command presented before making an utterance or gesture.

Subsequently, a third method for the user to realize the operation of a desired device by a simple interaction without error will be described.

The third method is basically applied to a device that performs a remote control operation. When the user performs the remote control operation, an equivalent utterance or gesture is presented to prompt the user to store an utterance or gesture command. Furthermore, the user learns that a similar operation to that of the remote control can be performed in another modal such as voice or gesture, and will perform an operation of the device without picking up the remote controller.

Figure 13:
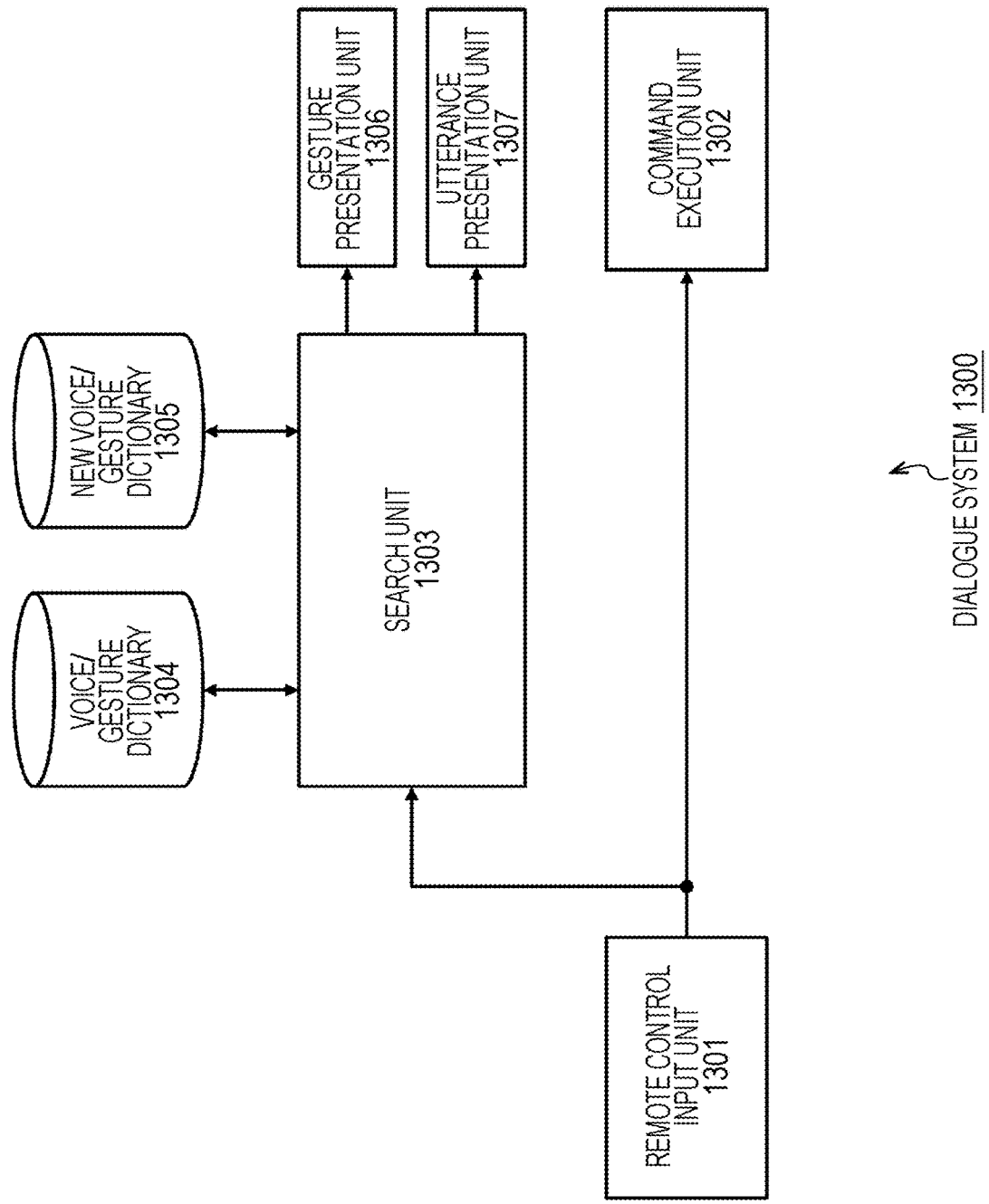
FIG. 13 is a diagram showing a functional configuration example of a dialogue system 1300.

FIG. 13 shows a functional configuration example of the dialogue system 1300 that notifies the user that a command can be issued by a modal other than the remote control. The dialogue system 1300 is implemented in the form of executing a predetermined voice agent application on the information device 100 shown in FIG. 1, for example.

The dialogue system 1300 shown in FIG. 13 includes a remote control input unit 1301, a command execution unit 1302, a search unit 1303, a voice/gesture dictionary 1304, a new voice/gesture dictionary 1305, a gesture presentation unit 1306, and an utterance presentation unit 1307. Some or all of these components are configured as software modules, for example.

The remote control input unit 1301 corresponds to the remote control reception unit 108 of the information device 100 shown in FIG. 1, for example, and receives and processes a remote control signal transmitted from a remote controller (not illustrated) by using infrared communication, short-range wireless communication, or the like to generate a command for operating the device.

The command execution unit 1302 executes the command generated by the remote control input unit 1301. The command includes not only a command for the dialogue system 1300 but also a command for an external device. In the former case, in the information device 100, which is the entity of the dialogue system 1300, the processing unit 101 executes processing of the command. Furthermore, in the latter case, the command is transmitted to the corresponding external device via the communication unit 102, for example.

The voice/gesture dictionary 1304 stores utterance commands and gesture commands corresponding to remote control commands. Furthermore, the new voice/gesture dictionary 1305 stores utterance commands and gesture commands newly created in a case where existing utterance commands or gesture commands corresponding to the remote control commands do not exist.

The search unit 1303 searches the voice/gesture dictionary 1304 or the new voice/gesture dictionary 1305 for an utterance command and gesture command corresponding to the remote control command generated by the remote control input unit 1301. Furthermore, in a case where an utterance command and gesture command corresponding to the remote control command generated by the remote control input unit 1301 does not exist in either the voice/gesture dictionary 1304 or the new voice/gesture dictionary 1305, the search unit 1303 creates at least one of the utterance command or gesture command corresponding to the remote control command, and stores it in the new voice/gesture dictionary 1305.

By presenting gesture, the gesture presentation unit 1306 assists the user in operating the device. For example, using the display unit 103 (or the screen of a television device cooperating with the dialogue system 1300 or the like), the gesture presentation unit 1306 presents a gesture command found by the search unit 1303 from the voice/gesture dictionary 1304 or the new voice/gesture dictionary 1305, and prompts the user to store or use a gesture command equivalent to the remote control command. Alternatively, the gesture presentation unit 1306 may output voice guidance from the voice output unit 105 to present a gesture command equivalent to the remote control command to the user.

By presenting utterance, the utterance presentation unit 1307 assists the user in operating the device. For example, using the display unit 103 (or the screen of a television device cooperating with the dialogue system 1300 or the like), the utterance presentation unit 1307 presents an utterance command found by the search unit 1303 from the voice/gesture dictionary 1304 or the new voice/gesture dictionary 1305, and prompts the user to store or use an utterance command equivalent to the remote control command. Alternatively, the gesture presentation unit 1306 may output voice guidance from the voice output unit 105 to present an utterance command equivalent to the remote control command to the user.

Note that if an equivalent gesture command or utterance command is presented in each remote control operation, the user sometimes finds it annoying. Therefore, adjustment may be made such that the presentation frequency is reduced for a gesture command and an utterance commands that have been presented a predetermined number of times or more, or the presentation frequency of equivalent gesture commands and utterance commands is increased for a remote control command whose number of usages and usage frequency have been increased.

Figure 14:
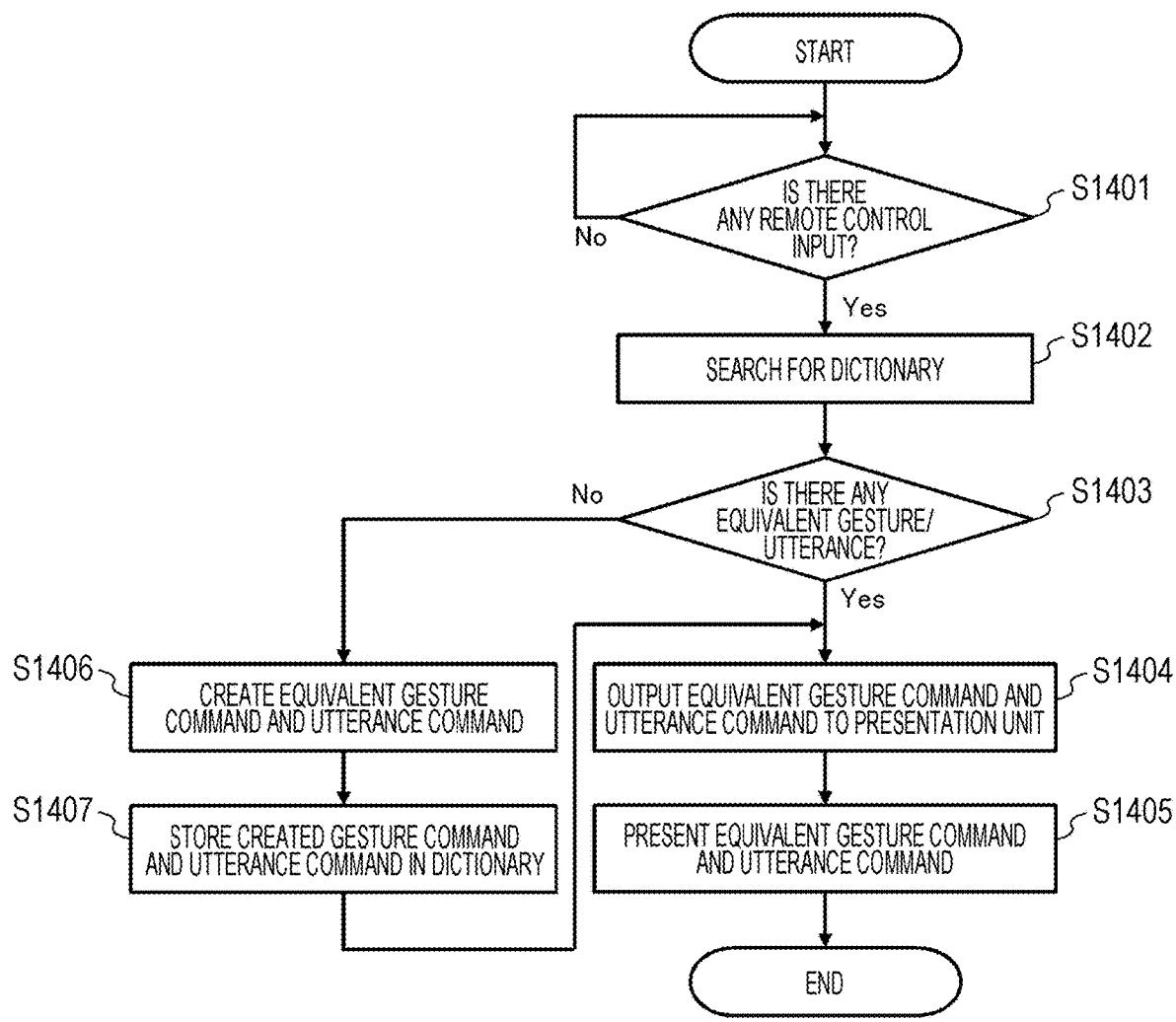
FIG. 14 is a flowchart showing an example of a processing procedure executed by the dialogue system 1300 at the time of interaction with the user.

FIG. 14 shows yet another example of the processing procedure executed by the dialogue system 1300 at the time of interaction with the user.

When the remote control input unit 1301 receives a remote control operation (Yes in step S1401), the remote control input unit 1301 generates a remote control command and outputs it to each of the search unit 1303 and the command execution unit 1302.

The search unit 1303 searches the voice/gesture dictionary 1304 and the new voice/gesture dictionary 1305 (step S1402) to check whether or not a gesture command or utterance command corresponding to the remote control command already exists (step S1403).

Here, in a case where a gesture command or utterance command corresponding to the remote control command is found in the voice/gesture dictionary 1304 or the new voice/gesture dictionary 1305 (Yes in step S1403), the search unit 1303 outputs the gesture command or utterance command to the gesture presentation unit 1307 or the utterance presentation unit 1308 (step S1404). Then, the gesture presentation unit 1307 and the utterance presentation unit 1308 present a gesture or utterance equivalent to the remote control operation to the user who has operated the remote control, and prompt the user to store and use the gesture command or utterance command equivalent to the remote control command (step S1405).

In a case where a gesture command or utterance command corresponding to the remote control command does not exist in the voice/gesture dictionary 1304 or the new voice/gesture dictionary 1305 (No in step S1403), the search unit 1303 creates at least one of the utterance command or gesture command corresponding to the remote control command (step S1406), 1305 and stores it in the new voice/gesture dictionary 1305 (step S1407).

Furthermore, the search unit 1303 outputs the newly created gesture command and utterance command to the gesture presentation unit 1307 and utterance presentation unit 1308 (step S1404). Then, the gesture presentation unit 1307 and the utterance presentation unit 1308 present a gesture or utterance equivalent to the remote control operation to the user who has operated the remote control, and prompt the user to store and use the gesture command or utterance command equivalent to the remote control command (step S1405).

As described above, if there is no utterance command or gesture command corresponding to the remote control command, the search unit 1303 newly creates an utterance command or gesture command corresponding to the remote control command and stores it in the new voice/gesture dictionary 1305. At this time, it is desirable that the newly created utterance command or gesture command is one that is not necessarily convenient for the user and is one that is easy for voice recognition or gesture recognition (or, difficult for false recognition). For example, a voice or gesture that is similar to that already in use is avoided. For example, each unused utterance or gesture may be scored in advance, and when a new utterance command or gesture command is created, the user may select the utterance command or gesture command in the order of score.

By being provided as a single system in combination with the dialogue system 200 shown in FIG. 2 or the dialogue system 900 shown in FIG. 9, for example, the dialogue system 1300 can constitute a system that allows the remote control operation to be performed, allows the operation of device to be performed also by a command of voice or gesture, and assists command issuance by a voice or gesture of the user.

Second Embodiment

Various multimedia devices can be connected to the television device. The television device is used not only for viewing television programs but also for viewing contents reproduced from DVDs or a Blu-rays and displaying game videos. However, there is a problem that different settings are often requested for the television device for each device. It is annoying to perform conversion of the input mode and screen mode every time the power of the television device is turned on. Such annoyance is found not only in the remote control or device operation but also in the operation by voice similarly.

Therefore, the second embodiment proposes a technology that presents a series of operations frequently performed by the user so as to be brought into one voice command or gesture command, or that allows the user to register by himself or herself a voice command or gesture command instructing an operation frequently performed by the user. According to the technology according to the second embodiment, for example, the setting operation that needs to be performed for each device every time the power of the television device is turned on can be shortcut to one voice command and easily operated.

Here, a case of watching a DVD using a television device will be discussed. Normally, the following steps 1 to 6 need to be performed on the television device side before the DVD to be viewed is inserted into the DVD player and reproduction is started.

Step 1: Turn on the power of the television device.
Step 2: Change the input mode.
Step 3: Change the screen mode.
Step 4: Change the sound mode.
Step 5: Adjust the volume.
Step 6: Load the DVD desired to be viewed into the tray of the DVD player.

Similarly, a plurality of steps is often required when starting use of not only a DVD player but also other multimedia devices connected to a television device. Furthermore, even in a case of viewing a television program with a television device, when the power is turned on in order to watch a routine news program at a particular time, for example, it is necessary to switch the channel if the television device is already tuned in on another channel.

The method includes a method of registering, by automatic presentation, a voice command or gesture command for collectively shortcutting a series of operations frequently performed by the user, and a method of manually registering by himself or herself a voice command or gesture command for collectively shortening a series of operations frequently performed by the user.

Registration of voice command by automatic presentation:

First, a method of registering by automatic presentation will be described.

Figure 15:
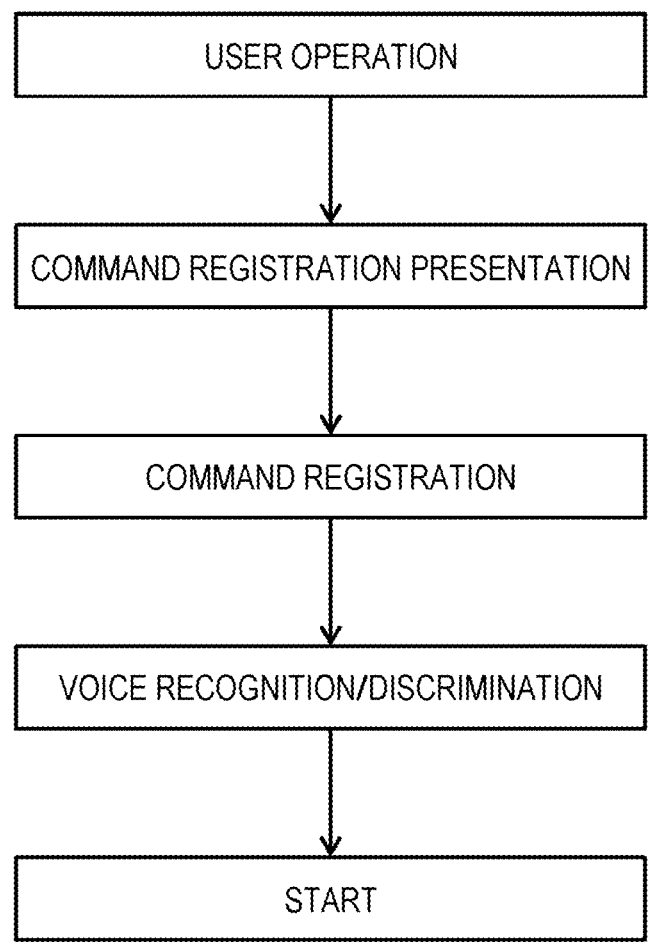
FIG. 15 is a diagram for explaining a method of registering, by automatic presentation, a voice command for collectively shortcutting a series of operations frequently performed by a user.

As shown in FIG. 15, this method includes the following five phases: "User Operation", where the user operates a device using a remote controller or the like; "Command Registration Presentation", where registering a series of operations as one collective command on the basis of the user's operation is proposed to the user; "Command Registration", where the proposed command is registered; "Voice Recognition/Discrimination", where the voice of the user uttering the registered command is recognized and discriminated; and "Start", where the recognized command is executed.

The processing of the phase in FIG. 15 is performed by the information device 100 (see FIG. 1) operating as a voice agent, for example. Furthermore, the processing of each phase is implemented in the form of a software module, for example. Each phase is described below.

1. User Operation:

The user operates the television device by using a remote controller, for example. All operations performed by the user on the television device are recorded including "Power On" and "Power Off" from the time when the user turns on the power of the television device to the time when the user shuts down the television device.

2. Command Registration Presentation:

When the user performs a series of operations on the television device and then no other operation is performed for a predetermined time or more, the flow of the operations up to that time point and the setting at that time point are recognized as one group. Then, it is proposed to register the group as one shortcut command to the user.

It is not necessary to make such proposal for all groups. A criterion to decide whether or not to make a proposal may be provided, such as that the same operation flow and setting have been repeated a predetermined number of times or more, for example. However, it is judged whether or not the same operation flow and setting have been repeated mainly regarding the final setting, with trifling elements (such as accurate volume) being ignored.

Figure 16:
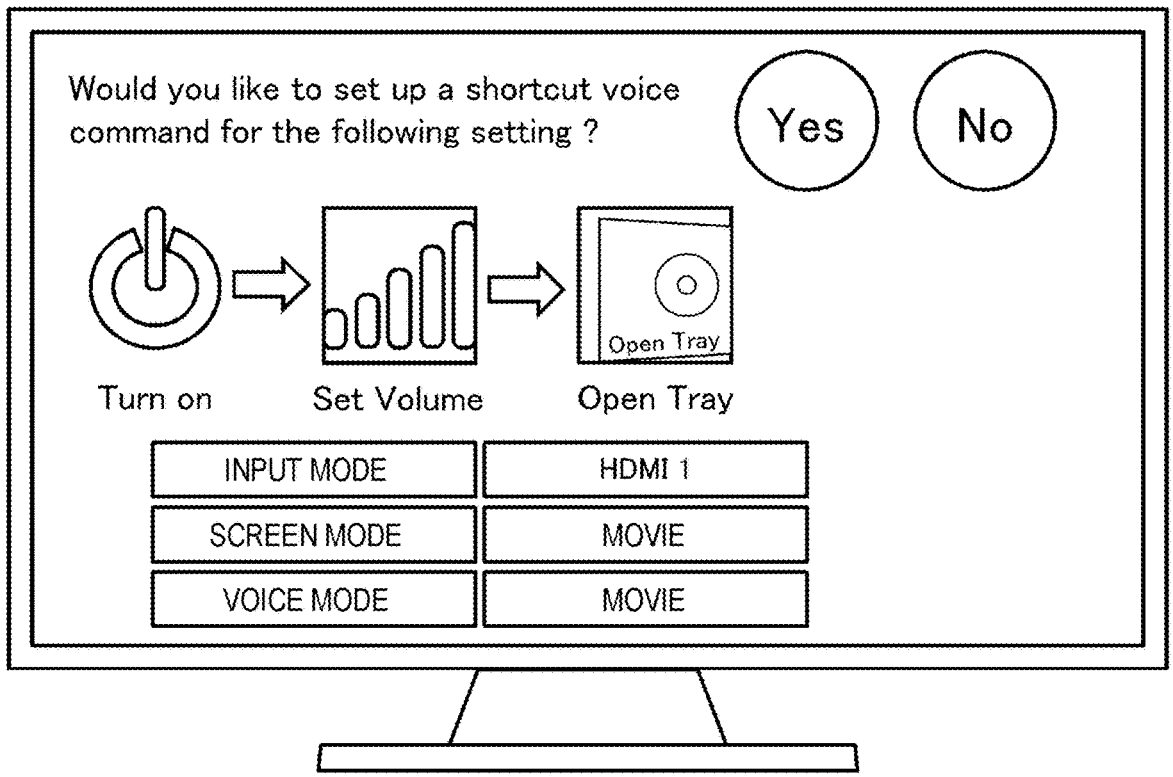
FIG. 16 is a view showing a configuration example of a GUI presenting a group of operations to be registered as commands.

FIG. 16 shows a configuration example of the GUI presenting a group of operations to be registered as commands. In the figure, it is assumed that the GUI is displayed using the screen of the television device, but the present invention is not limited thereto. For example, a similar GUI may be displayed on the screen of an information terminal that cooperates with a television device, such as a smartphone or a tablet.

In the GUI shown in FIG. 16, icons of the respective commands (Turn on (turning on the power of the television device), Set Volume (volume setting of the television device), and Open Tray (opening the tray of the DVD player)) that are brought into one group are displayed along the operation flow. Therefore, the user can easily confirm the operation flow in which a plurality of commands is brought into one group. Furthermore, the setting contents function as constants without affecting the positioning (such as order of setting) in the operation flow, such as the input mode, the screen mode, and the voice mode, are displayed in a different place from the array of the icons of the commands described above.

Note that the GUI illustrated in FIG. 16 assumes settings for watching a DVD by using a television device, but it is possible to register a plurality of operations as a shortcut voice command in which the plurality of operations is grouped into one in a case of not only the setting for each device but also, for example, automatic setting to a particular channel and the like similarly.

3. Command Registration:

The GUI shown in FIG. 16 displays icons of the respective commands brought into one group, setting contents (input mode, screen mode, voice mode, and the like) functioning as constants, as well as a message ("Would you like to set up a shortcut voice command for the following setting?") prompting the user to confirm whether or not to register the group of these operation commands as a shortcut command, a Yes button for permitting registration, and a No button for refusing registration. Then, registering the voice command is decided in response to the fact that the user has indicated his or her intention for registering the voice command in which the plurality of commands has been brought into one, such as pressing the Yes button (alternatively, selecting Yes via remote control) on such GUI.

Upon completing the setting of the command flow via the GUI shown in FIG. 16, a voice command for calling a series of commands is subsequently input. For example, it is assumed that a series of commands for watching a DVD using a television device is called with a natural voice such as "DVD". Furthermore, in a case of designating a channel to view with the television device instead of watching a DVD, it is assumed that a corresponding series of commands are called with a natural voice such as "NHK" or "News".

Figure 17:
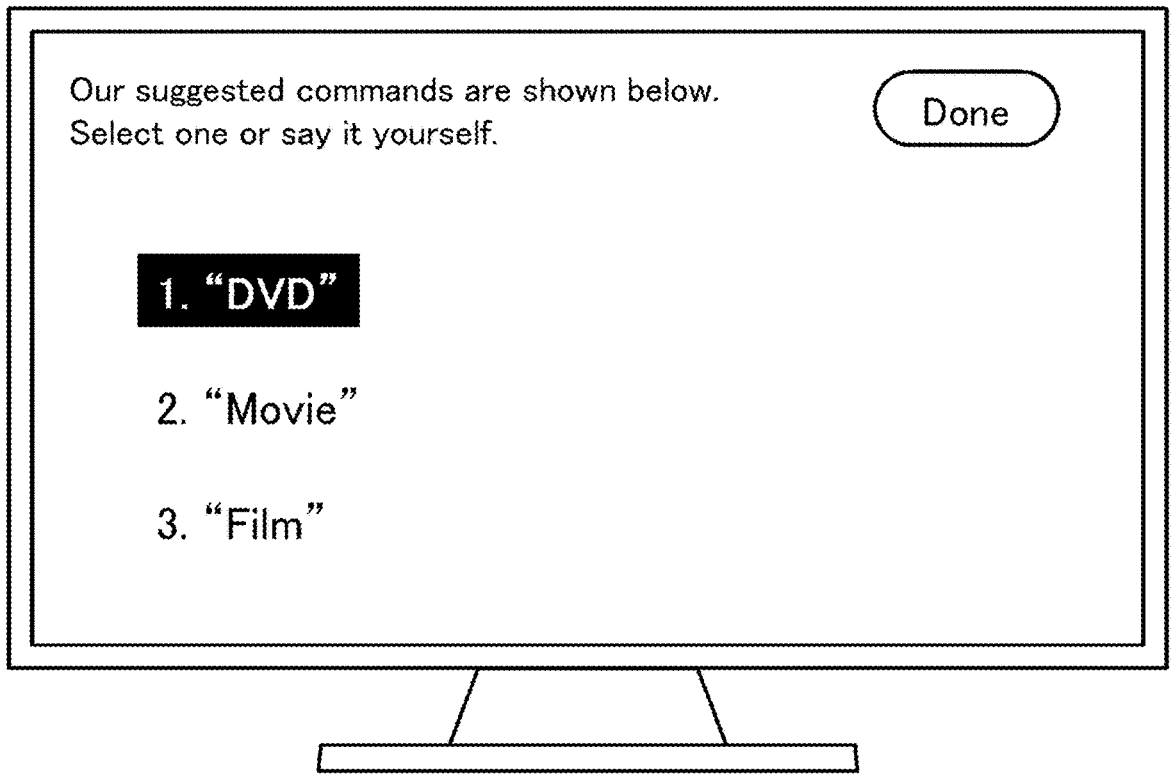
FIG. 17 is a view showing a configuration example of a GUI for registering a voice command.

FIG. 17 shows a configuration example of the GUI for registering a voice command. The illustrated GUI presents several voice command candidates on the basis of the commands and settings to be registered. Here, a voice command for calling a series of commands for watching a DVD using a television device is assumed, and the illustrated GUI presents "DVD", "Movie", and "Film" as estimated voice commands. Furthermore, this GUI displays a message ("Our suggested commands are shown below. Select one or say it yourself") that prompts the user to select one of the plurality of presented voice command candidates and a Done (Completed) button for fixing the selection. The user selects any one voice command candidate through a remote control operation or utterance. FIG. 17 highlights and displays the voice command candidate "DVD" as in a selected state. Then, when the user presses the Done button by the remote control operation (alternatively, the user may utter "Done (or Completed)"), the selection of the voice command candidate "DVD" is fixed and registered.

FIG. 17 illustrates simple one-word voice command candidates. Since there is a possibility that simple voice commands have already been registered, many types of variations are given so as not to overlap with the already registered voice commands. A suffix may be added as "DVD 1", for example. Alternatively, a voice command in which two or more words are combined may be used.

In addition, in a case of registering a voice command other than the candidate presented on the GUI as shown in FIG. 17, the user can designate a command desired by himself or herself. In such case, in order to enhance the safety of voice recognition or discrimination (e.g., in order not to register a falsely recognized voice command), it is desirable that the user repeatedly utters the user's desired voice command a plurality of times to register it.

Figure 18:
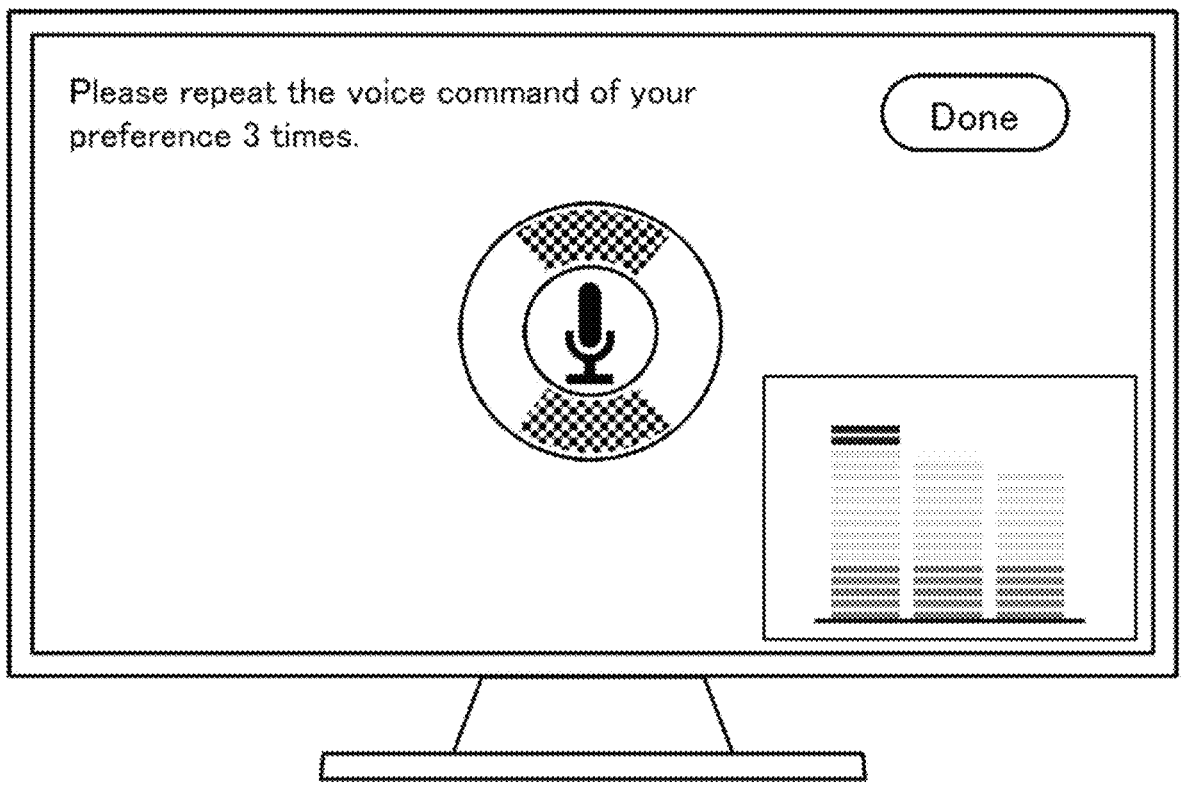
FIG. 18 is a view showing a configuration example of a GUI when a user registers a desired voice command.

FIG. 18 shows a configuration example of the GUI when the user registers a desired voice command. The illustrated GUI displays an icon indicating a state in which voice input is possible, and displays a message ("Please repeat the voice command of your preference 3 times.") that prompts the user to repeatedly utter the voice command the user desires three times. Furthermore, the frequency analysis result at the time of the user's utterance is displayed in the lower right. Furthermore, the Done (Completed) button indicating that the voice input has been fixed is displayed in the upper right. After repeatedly uttering the desired voice command three times, the user presses the Done button (alternatively, the user may utter "Done") to fix the input voice command.

4. Voice Recognition/Discrimination

When the voice command is newly registered as described above, the user enters a phase of uttering the newly registered voice command, and recognizes and discriminates the newly registered voice command. In order to recognize a face and a gesture, the camera of the television device needs to be active at all times, which is very costly and causes an issue of privacy. In that respect, voice recognition/discrimination is less costly and advantageous in terms of stability and practicality.

When discriminating a newly registered voice command, the number of samples corresponding to the voice command is inevitably small. Therefore, a learning algorithm based on a large amount of data is incompatible in this case. Therefore, in the present embodiment, it is proposed to adopt a method of learning from a small number of samples.

There are various methods of few-shot learning. One of the effective models is a model called prototypical network (see Non-Patent Document 1, for example). In the prototypical network, each class has m query samples of a particular class to be discriminated, and n support samples of k classes that are correct answer candidates, and this is called n-shot k-way setting. These n queries and k×n supports make up an episode. The model is trained with the parameters being updating so that the query is accurately discriminated to the corresponding support class.

5. Start:

Having registered a voice command in which a series of operations frequently performed by the user are brought into one in accordance with the procedures 1 to 4 described above, the user can thereafter instruct the device to perform the series of operations only by uttering this voice command.

For example, as shown in FIG. 16, a series of operations such as turning on the power of the television device (Turn on), adjusting the volume (Set Volume), and loading the DVD (Open Tray), when watching a DVD using the television device, and a plurality of setting operations such as setting the input mode to "HDMI 1", the screen mode to "Movie", and the voice mode to "Movie" are registered as the voice command "DVD" as shown in FIG. 17. In this case, when the user utters the voice command "DVD" in a state where the power of the television device is shut down, the series of commands included in this registration command, i.e., the series of operations such as turning on the power of the television device (Turn on), adjusting the volume (Set Volume), and loading a DVD (Open Tray) are sequentially started, and the plurality of setting operations of setting the input mode to "HDMI 1", the screen mode to "Movie", and the voice mode to "Movie" is realized.

Registration of Voice Command by Manual Operation:

Subsequently, a method for the user to manually register a voice command for collectively shortcutting a series of operations frequently performed by a user will be described.

Figure 19:
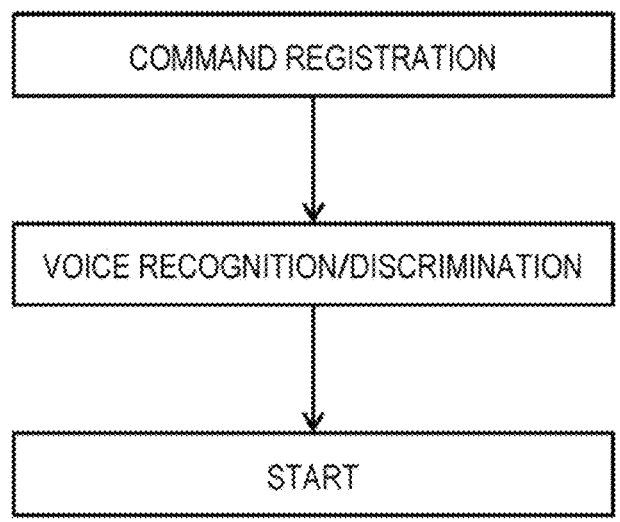
FIG. 19 is a diagram for explaining a method of manually registering a voice command for collectively shortcutting a series of operations frequently performed by a user.

As shown in FIG. 19, this method includes the following three phases: "Command Registration", where the user registers a command in which a series of operations are brought into one by the user himself or herself via an interface such as a GUI; "Voice Recognition/Discrimination", where the voice of the user uttering the registered command is recognized and discriminated; and "Start", where the recognized command is executed.

The processing of the phase in FIG. 19 is performed by the information device 100 (see FIG. 1) operating as a voice agent, for example. Furthermore, the processing of each phase is implemented in the form of a software module, for example. Each phase is described below.

1. Command Registration:

It is very difficult to bring a plurality of commands into one by a voice-based operation. Therefore, in the present embodiment, a GUI is used in order to easily bring a plurality of commands by a user's intuitive operation.

Figure 20:
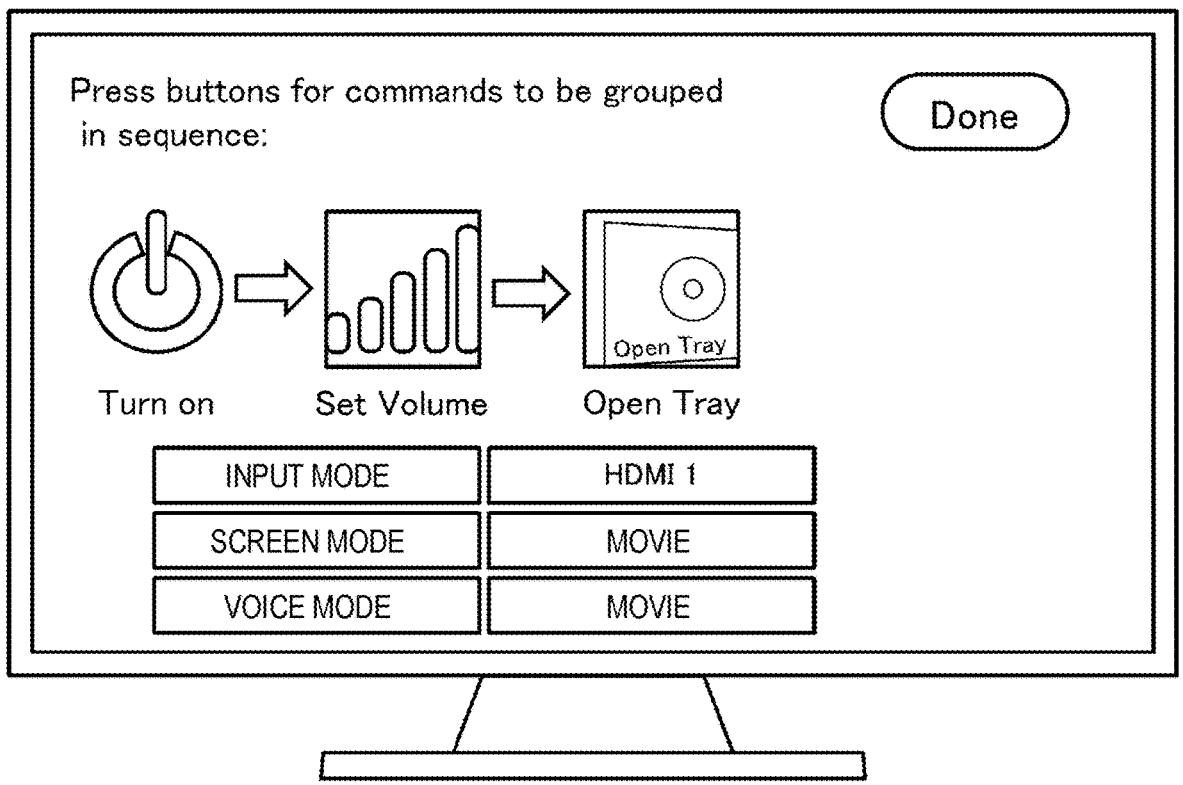
FIG. 20 is a view showing a configuration example of a GUI presenting a group of operations to be registered as commands.

FIG. 20 shows a configuration example of the GUI used when registering a command in which a plurality of commands is brought together. The illustrated GUI displays a message ("Press buttons for commands to be grouped in sequence.") that prompts the user to sequentially press the remote control buttons corresponding to the commands the user desires to bring into one. When the user presses, in the order of execution desired by the user, the buttons on the remote controller corresponding to the commands to be brought together in accordance with the message, the corresponding icons appear on the GUI in order. The GUI illustrated in FIG. 20 assumes command registration when watching a DVD using a television device. When the user presses the buttons on the remote control corresponding to these commands in the order of Turn on (turning on the power of the television device), Set Volume (volume setting of the television device), and Open Tray (opening the tray of the DVD player), the icons of the respective commands are displayed in the order of being pressed. Furthermore, when the contents of the functions as constants that do not affect the positioning (such as order of setting) in the operation flow, such as the input mode, the screen mode, and the voice mode, are set by the remote control operation, they are displayed in a different place from the array of the icons of the above commands. FIG. 20 shows an example in which a plurality of remote control operations of setting the input mode to "HDMI 1", the screen mode to "Movie", and the audio mode to "Movie" has been performed.

As shown in FIG. 20, from the GUI, the user can easily confirm the operation flow in which a plurality of commands is brought into one group. Note that in a case where the order of the commands selected by the user through the remote control operation is not appropriate or in a case where there is a better order of the commands, this fact may be fed back to the user via the GUI. Then, when the user presses the Done button by the remote control operation (alternatively, the user may utter "Done (or Completed)"), it is fixed that a voice command in which the plurality of commands displayed on the GUI is brought into one is registered.

Note that the GUI illustrated in FIG. 20 assumes settings for watching a DVD by using a television device, but it is possible to register a plurality of operations as a shortcut command in which the plurality of operations is grouped into one in a case of not only the setting for each device but also, for example, automatic setting to a particular channel and the like similarly.

Then, when the registration of the command in which the plurality of commands is brought together is completed by the manual operation of the user through the GUI as shown in FIG. 20, the registration of the voice command is subsequently performed. The user may select the character string of a voice command through a GUI presenting several voice command candidates estimated from a series of commands, as shown in FIG. 17 for example. Then, the voice command may be registered by the user repeatedly uttering the desired voice command a plurality of times.

2. Voice Recognition/Discrimination

When the voice command is newly registered as described above, the user enters a phase of uttering the newly registered voice command, and recognizes and discriminates the newly registered voice command. In order to recognize a face and a gesture, the camera of the television device needs to be active at all times, which is very costly and causes an issue of privacy. In that respect, voice recognition/discrimination is less costly and advantageous in terms of stability and practicality.

When discriminating a newly registered voice command, the number of samples corresponding to the voice command is inevitably small. Therefore, a learning algorithm based on a large amount of data is incompatible in this case. Therefore, in the present embodiment, it is proposed to adopt a method of learning from a small number of samples. There are various methods of few-shot learning. One of the effective models is the prototypical network (see Non-Patent Document 1, for example).

3. Start

Having registered a voice command in which a series of operations frequently performed by the user are brought into one in accordance with the procedures 1 and 2 described above, the user can thereafter instruct the device to perform the series of operations only by uttering this voice command.

For example, as shown in FIG. 20, a series of operations such as turning on the power of the television device (Turn on), adjusting the volume (Set Volume), and loading the DVD (Open Tray), when watching a DVD using the television device, and a plurality of setting operations such as setting the input mode to "HDMI 1", the screen mode to "Movie", and the voice mode to "Movie" are registered as the voice command "DVD". In this case, when the user utters the voice command "DVD" in a state where the power of the television device is shut down, the series of commands included in this registration command, i.e., the series of operations such as turning on the power of the television device (Turn on), adjusting the volume (Set Volume), and loading a DVD (Open Tray) are sequentially started, and the plurality of setting operations of setting the input mode to "HDMI 1", the screen mode to "Movie", and the voice mode to "Movie" is realized.

Third Embodiment

As a second embodiment, the technology that presents a series of operations frequently performed by the user so as to be brought into one voice command, or that allows the user to register by himself or herself a voice command instructing the series of operations has been described above. In a case where a plurality of commands including "Power On" and "Power Off" is brought into one command, the voice command is easy. However, unless limited to a plurality of commands, there is no necessity that voice commands are superior to gesture commands. Furthermore, some users may find gesture commands more convenient than voice commands. However, since the gesture does not directly use language, it is considered to be more difficult for the user to recall by himself or herself a characteristic command than to recall the voice.

Therefore, the third embodiment proposes a technology that allows the user to easily register an operation frequently performed by the user as a gesture command, regardless of whether the operation to the device is a single operation or a plurality of operations.

Figure 21:
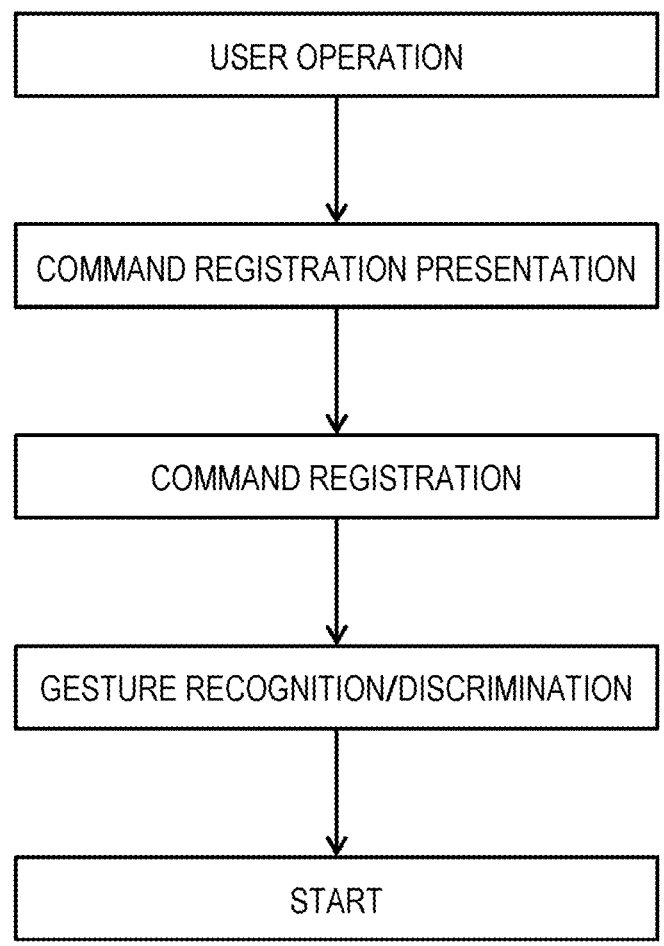
FIG. 21 is a diagram for explaining a method of registering, as a gesture command, an operation frequently performed by a user.

As shown in FIG. 21, the method for registering an operation frequently performed by the user as a gesture command includes the following five phases: "User Operation", where the user operates a device using a remote controller or the like; "Command Registration Presentation", where registering an operation frequently performed by the user as a gesture command is proposed to the user; "Command Registration", where the proposed command is registered; "Gesture Recognition/Discrimination", where the gesture of the user uttering the registered command is recognized and discriminated; and "Start", where the recognized command is executed.

Similarly to the second embodiment, the most characteristic point is that not only registration of the gesture command is proposed but also a new gesture is proposed in the second command registration presentation phase. The number of shortcut commands registered on the basis of the second embodiment and actually used by the user is highly likely to be limited. Therefore, it seems sufficient to propose a gesture by picking up from a pool of several tens of candidates or by combining two or more gesture candidates.

The processing of the phase in FIG. 21 is performed by the information device 100 (see FIG. 1) operating as a voice agent, for example. Furthermore, the processing of each phase is implemented in the form of a software module, for example. Each phase is described below.

1. User Operation:

The user operates the television device by using a remote controller, for example. The operations performed by the user on the television device are recorded. However, it is not necessary to record all operations from the time when the user turns on the power of the television device to the time when the user shuts down the television device.

2. Command Registration Presentation:

After the user has frequently performed a particular operation on the television device, it is proposed for the user to register the operation as a gesture command.

However, the "particular operation" for which the gesture command is registered may be one operation or a plurality of operations. For example, when a series of operations is performed and then no other operation is performed for a predetermined time or more, it may be proposed to register a series of operations regarded as one group as a gesture command. Furthermore, regarding whether or not a certain operation has been frequently performed, a criterion to decide whether or not to make a proposal may be provided, such as a certain operation has been performed more than a predetermined number of times within a predetermined period, for example.

The command registration presentation includes two stages of proposal of the command registration itself and proposal of a gesture used as a command.

Figure 22:
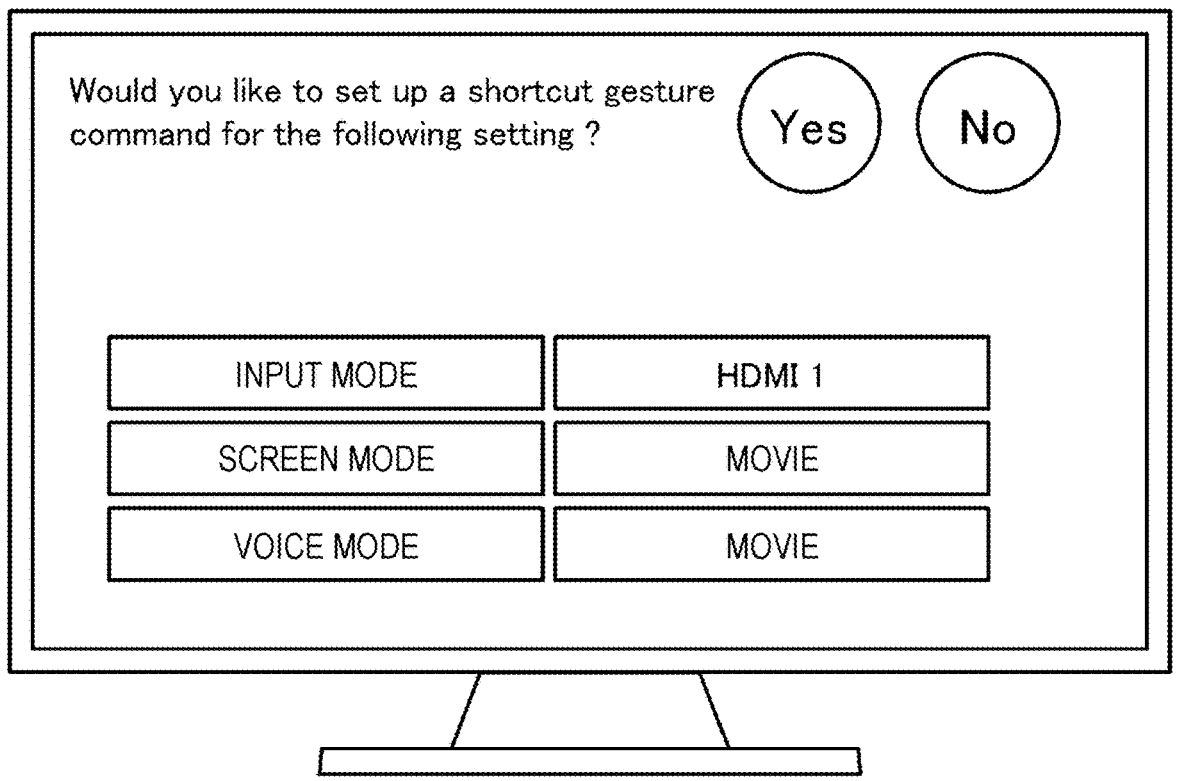
FIG. 22 is a view showing a configuration example of a GUI proposing command registration itself to a user.

FIG. 22 shows a configuration example of the GUI proposing command registration itself to the user. In the figure, it is assumed that the GUI is displayed using the screen of the television device, but the present invention is not limited thereto. For example, a similar GUI may be displayed on the screen of an information terminal that cooperates with a television device, such as a smartphone or a tablet.

The GUI shown in FIG. 22 displays a plurality of frequently performed operations of setting the input mode to "HDMI 1", the screen mode to "Movie", and the voice mode to "Movie". Furthermore, this GUI displays a message ("Would you like to set up a shortcut gesture command for the following setting?") prompting the user to confirm whether or not to register the above-described operation command as a shortcut gesture command, a Yes button for permitting registration of the gesture command, and a No button for refusing the registration. Then, registering the gesture command is decided in response to the fact that the user has indicated his or her intention for registering a command being displayed as a gesture command, such as pressing the Yes button (alternatively, selecting Yes via remote control) on such GUI.

Figure 23:
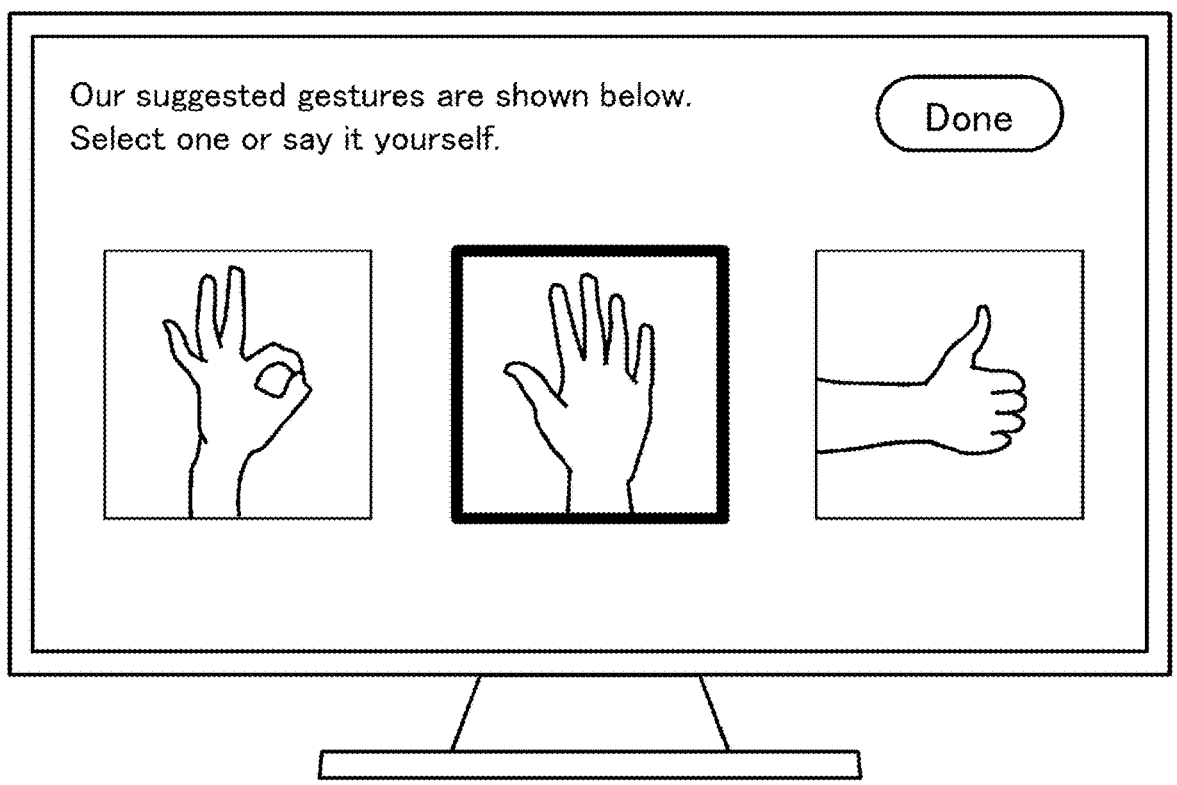
FIG. 23 is a view showing a configuration example of a GUI proposing, to a user, a gesture used as a command.

FIG. 23 shows a configuration example of the GUI proposing, to the user, a gesture used as a command. The illustrated GUI presents several gesture command candidates on the basis of the commands and settings to be registered. For example, gesture command candidates picked up from a pool of several tens of candidates or gesture command candidates in which two or more gestures are combined are displayed. Furthermore, only hand gesture candidates are listed in FIG. 23, but gesture candidates including upper, lower, left, and right motions of the face or the arm and facial expressions such as winks may also be included. In addition, various other gestures such as a funny face may be included in the gesture candidates. In any case, by giving priority to each of the gesture candidates in advance or the like, gestures may be proposed in order of user-friendliness to the user.

Furthermore, the GUI shown in FIG. 23 displays a message ("Our suggested gestures are shown below. Select one or perform the gesture yourself") that prompts the user to select one of the plurality of presented gesture command candidates and a Done (Completed) button for fixing the selection. The user selects any one gesture command candidate through a remote control operation or utterance. Furthermore, when the user performs a desired gesture, which is captured with the camera and subjected to image recognition, the user can select a gesture command candidate. FIG. 23 highlights and displays the gesture command candidate displayed in the center of the GUI as in a selected state. Then, when the user presses the Done button by the remote control operation (alternatively, the user may utter "Done (or Completed)"), the selection of the gesture command candidate is fixed and registered.

3. Command Registration:

The command for registering a gesture is selected through the GUI shown in FIG. 22, and subsequently the gesture to be used as the command is decided through the GUI shown in FIG. 23.

Figure 24:
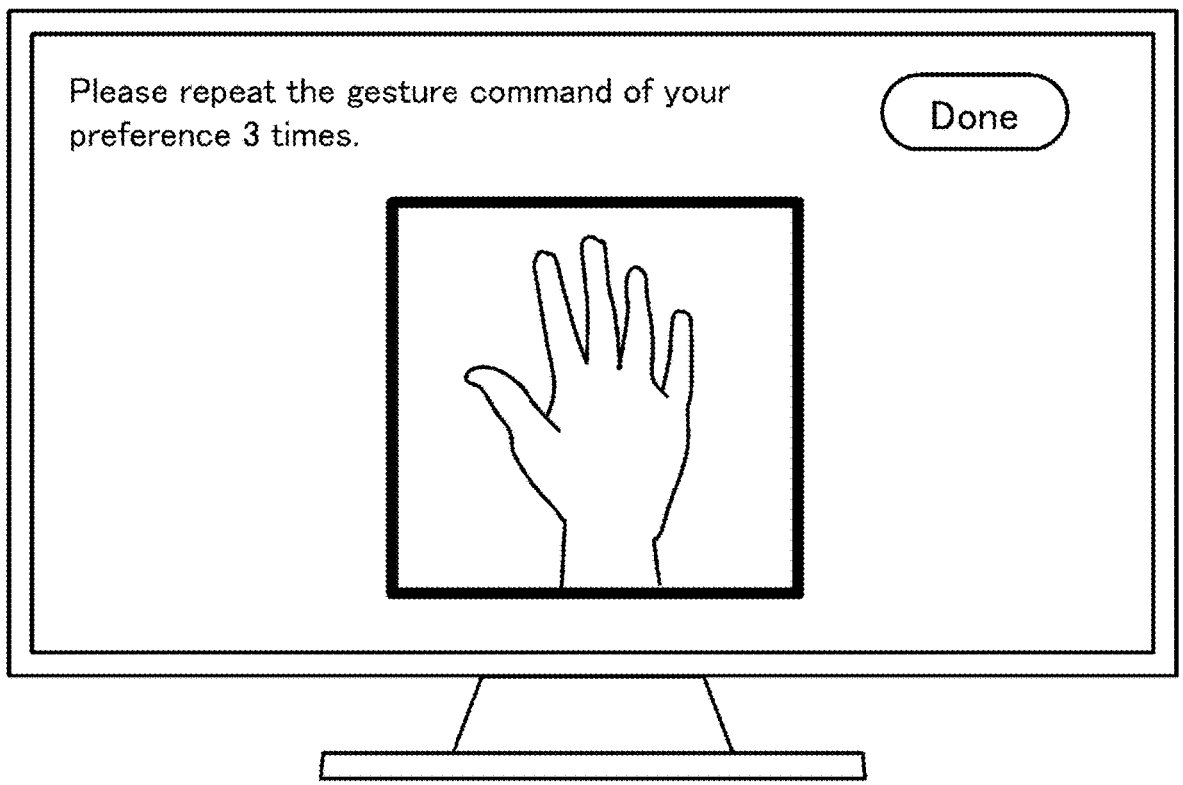
FIG. 24 is a view showing a configuration example of a GUI when registering a gesture command desired by a user.

FIG. 24 shows a configuration example of the GUI when registering a gesture command desired by the user. The illustrated GUI displays an icon of the gesture fixed to be registered, and displays a message ("Please repeat the gesture command of your preference 3 times.") that prompts the user to repeatedly perform the gesture command the user desires three times. Furthermore, the Done (Completed) button indicating that the gesture input has been fixed is displayed in the upper right. After repeatedly uttering the desired gesture command three times, the user presses the Done button (alternatively, the user may utter "Done") to fix the input gesture command.

4. Gesture Recognition/Discrimination

When the gesture command is newly registered as described above, the user enters a phase of performing the newly registered gesture command, and recognizes and discriminates the newly registered gesture command.

When discriminating a newly registered gesture command, the number of samples corresponding to the gesture command is inevitably small. Therefore, a learning algorithm based on a large amount of data is incompatible in this case. Therefore, in the present embodiment, it is proposed to adopt a method of learning from a small number of samples. There are various methods of few-shot learning. One of the effective models is the prototypical network (see Non-Patent Document 1, for example).

5. Start:

Having registered a gesture command in which a series of operations frequently performed by the user are brought into one in accordance with the procedures 1 to 4 described above, the user can thereafter instruct the device to perform the series of operations only by uttering this gesture command.

INDUSTRIAL APPLICABILITY

The technology disclosed in the present description has been described in detail with reference to particular embodiments. However, it is obvious that a person skilled in the art can modify or substitute the embodiments without departing from the scope of the technology disclosed in the present description.

While the present description has mainly described embodiments in which the technology disclosed in the present description is applied to a dialogue system also called a "voice agent" or "assistant", the scope of the technology disclosed in the present description is not limited thereto. The technology disclosed in the present description can be applied to various types of information processing devices in which the user can issue commands with a plurality of modals such as utterances and gestures.

In short, the technology disclosed in the present description has been described in the form of exemplification, and the description contents in the present description should not be interpreted in a limited manner. In order to judge the scope of the technology disclosed in the present description, the claims should be taken into consideration.

Note that the technology disclosed in the present description can have the following configuration.

(1) An information processing device including:

an input unit that receives input from a user; and a presentation unit that presents information regarding a command for operating a predetermined device on the basis of the input.

(2) The information processing device according to (1) described above, in which the presentation unit presents a candidate of a command partially matching the input.

(3) The information processing device according to (2) described above in which the input unit receives input by at least one of voice or gesture from a user, and the presentation unit presents a candidate of a command including at least one of voice or gesture.

(4) The information processing device according to (2) described above, further including:

a command execution unit that executes a command on the basis of the input and a combination of candidates of command selected by a user.

(5) The information processing device according to any of (1) to (4) described above, in which the presentation unit presents a candidate of a command associated with the input.

(6) The information processing device according to (5) described above, further including:

a storage unit that stores immediately preceding input for each command, in which the storage unit searches immediately preceding input similar to the input, and the presentation unit presents a candidate of a command corresponding to similar immediately preceding input.

(7) The information processing device according to any of (5) or (6) described above, in which the input unit receives input by at least one of voice or gesture from a user, the storage unit stores immediately preceding voice or gesture for each command, and the presentation unit presents a candidate of a command corresponding to voice or gesture from a user similar to voice or gesture from a user received by the input unit.

(8) The information processing device according to any of (5) to (7) described above, further including:

a command execution unit that executes a command on the basis of a candidate of a command selected by a user.

(9) The information processing device according to any of (1) to (8) described above, in which the input unit receives input from a user in a plurality of types of modalities, and the presentation unit presents a command of another modality equivalent to the input.

(10) The information processing device according to (9) described above, in which the input unit receives a remote control command, and the presentation unit presents a gesture or voice command equivalent to the remote control command.

(11) The information processing device according to any of (1) to (10) described above, in which the presentation unit presents a plurality of device operations brought into one group, and presents a candidate of a command corresponding to the group.

(12) The information processing device according to (11) described above, in which the presentation unit presents, as one group, a series of device operations frequently performed by a user.

(13) The information processing device according to (11) described above, in which the presentation unit presents, as one group, a plurality of a plurality of device operations selected by a user.

(14) The information processing device according to any of (11) to (13) described above, in which the presentation unit presents a voice command candidate.

(15) The information processing device according to any of (11) to (14) described above, in which a candidate of a command selected by a user is registered as a command for the device operation, and the information processing device further includes a start unit that starts an operation of a corresponding device in response that the registered command is input from a user.

(16) The information processing device according to any of (1) to (15) described above, in which the presentation unit presents one or a plurality of device operations frequently performed by a user, and presents a candidate of a gesture command corresponding to the device operation.

(17) The information processing device according to (16) described above, in which a candidate of a gesture command selected by a user is registered, and the information processing device further includes a start unit that starts an operation of a corresponding device in response that the registered gesture command is input from a user.

(18) An information processing method having an input step of receiving input from a user, and a presentation step of presenting information regarding a command for operating a predetermined device on the basis of the input.

(19) A computer program described in a computer-readable format so as to cause a computer to function as an input unit that receives input from a user, and a presentation unit that presents information regarding a command for operating a predetermined device on the basis of the input.

REFERENCE SIGNS LIST

100 Information device
101 Processing unit
102 Communication unit
103 Display unit
104 Voice input unit
105 Voice output unit
106 Image-capturing unit
107 Sensor unit
108 Remote control reception unit
109 Recording unit
200 Dialogue system
201 Voice recognition unit
202 Gesture recognition unit
203 Search unit
204 Command dictionary
205 Determination unit
206 Modal decision unit
207 Gesture presentation unit
208 Utterance presentation unit
209 Command generation unit
210 Command execution unit
900 Dialogue system
901 Voice input unit 902 Image input unit
903 Search unit
904 Recognition dictionary
905 Additional recognition dictionary
906 Gesture presentation unit
907 Utterance presentation unit
908 Command generation unit
909 Command execution unit
1300 Dialogue system
1301 Remote control input unit
1302 Command execution unit
1303 Search unit
1304 Voice/gesture dictionary
1305 New voice/gesture dictionary
1306 Gesture presentation unit
1307 Utterance presentation unit

The invention claimed is:

1. An information processing device comprising:
an interface configured to receive input from a user by way of at least one of voice input and gesture input of the user;
presentation circuitry configured to present at least two candidate commands for at least two different types of operations of a predetermined device for the user's selection of a desired one of the candidate commands for operating the predetermined device, the candidate commands being associated with the input from the user, and each of the candidate commands being presented as a first candidate command of a first type of modal and a second candidate command of a second type of modal which is different from the first type of modal;
a memory configured to store preceding voice or gesture input of the user immediately preceding each command; and
search circuitry configured to search in the memory the preceding voice or gesture input that is similar to the input from the user, wherein
the presentation circuitry is further configured to present at least two candidate commands for at least two different types of operations of the predetermined device corresponding to the preceding voice or gesture input searched by the search circuitry.

2. The information processing device according to claim 1, further comprising:
command execution circuitry configured to execute a command based on a combination of the input and the desired one of the candidate commands selected by the user.

3. The information processing device according to claim 1, further comprising:
command execution circuitry configured to execute the desired one of the candidate commands selected by the user.

4. The information processing device according to claim 1, wherein
the presentation circuitry is further configured to present at least one device operation frequently performed by the user, and to present at least two candidate gesture commands for operation of the predetermined device for selection by the user.

5. The information processing device according to claim 4, wherein
a candidate gesture command selected by the user is registered, and
the information processing device further comprises starter circuitry configured to start an operation of the predetermined device in response to that the registered gesture command is input from the user.

6. An information processing device comprising:
an interface configured to receive input from a user; and
presentation circuitry configured to present at least two candidate commands for at least two different types of operations of a predetermined device for the user's selection of a desired one of the candidate commands for operating the predetermined device, the candidate commands being associated with the input from the user, and each of the candidate commands being presented as a first candidate command of a first type of modal and a second candidate command of a second type of modal which is different from the first type of modal, wherein
the input from the user is in one of a plurality of types of modals, including a voice modal and a gesture modal, and
the presentation circuitry is further configured to present the candidate commands for the different types of operations of the predetermined device in a different type of modal from a type of modal of the input from the user.

7. The information processing device according to claim 6, wherein
the interface is further configured to receive a remote control command transmitted from an external remote controller operated by the user, and
the presentation circuitry is further configured to present a gesture or voice command equivalent to the remote control command.

8. The information processing device according to claim 6, wherein
the presentation circuitry is further configured to present a plurality of device operations brought into one group, and to present at least one candidate command corresponding to the group.

9. The information processing device according to claim 8, wherein
the presentation circuitry is further configured to present, as one group, a series of device operations frequently performed by the user.

10. The information processing device according to claim 8, wherein
the presentation circuitry is further configured to present, as one group, a plurality of device operations selected by the user.

11. The information processing device according to claim 8, wherein
the desired one of the candidate commands selected by the user is registered as a command for the device operation, and
the information processing device further comprises starter circuitry configured to start an operation of the predetermined device in response to that the registered command is input from the user.

12. An information processing method executed by an information processing device, the method comprising:
receiving input from a user by way of at least one of voice input and gesture input of the user;
presenting at least two candidate commands for at least two different types of operations of a predetermined device for the user's selection of a desired one of the candidate commands for operating the predetermined device, the candidate commands being associated with the input from the user, and each of the candidate commands being presented as a first candidate command of a first type of modal and a second candidate command of a second type of modal which is different from the first type of modal;

storing in a memory preceding voice or gesture input of the user immediately preceding each command; and searching in the memory the preceding voice or gesture input that is similar to the input from the user, wherein the presenting further presents at least two candidate commands for at least two different types of operations of the predetermined device corresponding to the preceding voice or gesture input searched in the searching.

13. A non-transitory computer-readable storage medium storing a computer program described in a computer-readable format so as to cause a computer to function as an information processing device comprising:

an interface configured to receive input from a user; and presentation circuitry configured to present at least two candidate commands for at least two different types of operations of a predetermined device for the user's selection of a desired one of the candidate commands for operating the predetermined device, the candidate commands being associated with the input from the user, and each of the candidate commands being presented as a first candidate command of a first type of modal and a second candidate command of a second type of modal which is different from the first type of modal, wherein the input from the user is in one of a plurality of types of modals, including a voice modal and a gesture modal, and the presentation circuitry is further configured to present the candidate commands for the different types of operations of the predetermined device in a different type of modal from a type of modal of the input from the user.

* * * * *